(12) United States Patent
Kiefhaber et al.

(10) Patent No.: US 7,734,032 B1
(45) Date of Patent: Jun. 8, 2010

(54) CONTACT CENTER AND METHOD FOR TRACKING AND ACTING ON ONE AND DONE CUSTOMER CONTACTS

(75) Inventors: Sarah H. Kiefhaber, Boulder, CO (US); Joylee E. Kohler, Northglenn, CO (US); Henry R. Paddock, Boulder, CO (US); Katherine A. Sobus, Wilmington, DE (US); Rodney A. Thomson, Westminster, CO (US)

(73) Assignee: Avaya Inc., Basking Ridge, NJ (US)

( * ) Notice: Subject to any disclaimer, the term of this patent is extended or adjusted under 35 U.S.C. 154(b) by 936 days.

(21) Appl. No.: 10/815,534

(22) Filed: Mar. 31, 2004

(51) Int. Cl.
*H04M 3/00* (2006.01)

(52) U.S. Cl. .................. 379/265.01; 379/265.13; 379/266.01; 379/266.02; 379/266.1

(58) Field of Classification Search .......... 379/265.09, 379/265.13, 266.01, 266.02, 266.1, 265.01
See application file for complete search history.

(56) References Cited

U.S. PATENT DOCUMENTS

| | | |
|---|---|---|
| 4,163,124 A | 7/1979 | Jolissaint |
| 4,510,351 A | 4/1985 | Costello et al. |
| 4,567,323 A | 1/1986 | Lottes et al. ............... 179/18 B |
| 4,737,983 A | 4/1988 | Frauenthal et al. |
| 4,797,911 A | 1/1989 | Szlam et al. |
| 4,894,857 A | 1/1990 | Szlam et al. |
| 5,001,710 A | 3/1991 | Gawrys et al. |
| 5,097,528 A | 3/1992 | Gursahaney et al. |
| 5,101,425 A | 3/1992 | Darland |
| 5,155,761 A | 10/1992 | Hammond ................... 379/67 |

(Continued)

FOREIGN PATENT DOCUMENTS

CA 2143198 1/1995

(Continued)

OTHER PUBLICATIONS

U.S. Appl. No. 10/815,584, filed Mar. 31, 2004, Kiefhaber.

(Continued)

*Primary Examiner*—William J Deane
*Assistant Examiner*—Khai N Nguyen
(74) *Attorney, Agent, or Firm*—Sheridan Ross P.C.

(57) ABSTRACT

The present invention is directed to a contact center for servicing contacts having (a) an input to receive a first contact from a first customer; (b) a selector (i) to determine whether the first contact is related to another contact with the first customer and (ii) when the first contact is related to another contact with the first customer, to service the contact differently than when the first contact is unrelated to another contact with the first customer; and/or (c) a repeat contact determining agent (i) to track, a set of the plurality of agents over a selected time period, a number of contacts serviced by the agent set that are related to another contact serviced by the plurality of agents and (ii) to maintain, for each of the plurality of agents, an indicator indicating one or more of (a) a number of contacts, serviced by the agent set during the selected time period, that are not related to another contact serviced by the agent and (b) a number of contacts, serviced by the agent set during the selected time period, that are related to another contact serviced by the agent.

38 Claims, 4 Drawing Sheets

U.S. PATENT DOCUMENTS

| | | |
|---|---|---|
| 5,164,981 A | 11/1992 | Mitchell et al. |
| 5,164,983 A | 11/1992 | Brown et al. |
| 5,167,010 A | 11/1992 | Elm et al. |
| 5,185,780 A | 2/1993 | Leggett |
| 5,206,903 A | 4/1993 | Kohler et al. ............... 379/309 |
| 5,210,789 A | 5/1993 | Jeffus et al. |
| 5,274,700 A | 12/1993 | Gechter et al. |
| 5,278,898 A | 1/1994 | Cambray et al. |
| 5,289,368 A | 2/1994 | Jordan et al. |
| 5,291,550 A | 3/1994 | Levy et al. ................. 379/242 |
| 5,299,260 A | 3/1994 | Shaio ......................... 379/265 |
| 5,309,513 A | 5/1994 | Rose .......................... 379/265 |
| 5,325,292 A | 6/1994 | Crockett |
| 5,335,268 A | 8/1994 | Kelly, Jr. et al. |
| 5,335,269 A | 8/1994 | Steinlicht ................... 379/266 |
| 5,390,243 A | 2/1995 | Casselman et al. |
| 5,436,965 A | 7/1995 | Grossman et al. |
| 5,444,774 A | 8/1995 | Friedes |
| 5,467,391 A | 11/1995 | Donaghue, Jr. et al. |
| 5,469,503 A | 11/1995 | Butensky et al. |
| 5,469,504 A | 11/1995 | Blaha |
| 5,473,773 A | 12/1995 | Aman et al. |
| 5,479,497 A | 12/1995 | Kovarik |
| 5,499,291 A | 3/1996 | Kepley |
| 5,500,795 A | 3/1996 | Powers et al. |
| 5,504,894 A | 4/1996 | Ferguson et al. |
| 5,506,898 A | 4/1996 | Costantini et al. ........... 379/266 |
| 5,530,744 A | 6/1996 | Charalambous et al. |
| 5,537,470 A | 7/1996 | Lee ............................. 379/266 |
| 5,537,542 A | 7/1996 | Eilert et al. |
| 5,544,232 A | 8/1996 | Baker et al. |
| 5,546,452 A | 8/1996 | Andrews et al. ............ 379/219 |
| 5,555,299 A | 9/1996 | Maloney et al. |
| 5,577,169 A | 11/1996 | Prezioso |
| 5,592,378 A | 1/1997 | Cameron et al. ............ 395/227 |
| 5,592,542 A | 1/1997 | Honda et al. |
| 5,594,726 A | 1/1997 | Thompson et al. .......... 370/485 |
| 5,603,029 A | 2/1997 | Aman et al. |
| 5,604,892 A | 2/1997 | Nuttall et al. |
| 5,606,361 A | 2/1997 | Davidsohn et al. ............ 348/14 |
| 5,611,076 A | 3/1997 | Durflinger et al. |
| 5,627,884 A | 5/1997 | Williams et al. ............... 379/67 |
| 5,642,515 A | 6/1997 | Jones et al. |
| 5,684,872 A | 11/1997 | Flockhart et al. ............ 379/266 |
| 5,684,874 A | 11/1997 | Flockhart et al. |
| 5,684,964 A | 11/1997 | Powers et al. |
| 5,689,698 A | 11/1997 | Jones et al. |
| 5,703,943 A | 12/1997 | Otto |
| 5,713,014 A | 1/1998 | Durflinger et al. |
| 5,721,770 A | 2/1998 | Kohler |
| 5,724,092 A | 3/1998 | Davidsohn et al. ............ 348/14 |
| 5,740,238 A | 4/1998 | Flockhart et al. ............ 379/221 |
| 5,742,675 A | 4/1998 | Kilander et al. |
| 5,742,763 A | 4/1998 | Jones |
| 5,748,468 A | 5/1998 | Notenboom et al. |
| 5,749,079 A | 5/1998 | Yong et al. |
| 5,751,707 A | 5/1998 | Voit et al. ................... 370/384 |
| 5,752,027 A | 5/1998 | Familiar |
| 5,754,639 A | 5/1998 | Flockhart et al. ............ 379/221 |
| 5,754,776 A | 5/1998 | Hales et al. |
| 5,754,841 A | 5/1998 | Carino, Jr. |
| 5,757,904 A | 5/1998 | Anderson |
| 5,784,452 A | 7/1998 | Carney |
| 5,790,642 A | 8/1998 | Taylor et al. |
| 5,790,650 A | 8/1998 | Dunn et al. |
| 5,790,677 A | 8/1998 | Fox et al. ....................... 380/24 |
| 5,794,250 A | 8/1998 | Carino, Jr. et al. |
| 5,796,393 A | 8/1998 | MacNaughton et al. |
| 5,802,282 A | 9/1998 | Hales et al. |
| 5,802,510 A | 9/1998 | Jones |
| 5,818,907 A | 10/1998 | Maloney et al. ............... 379/34 |
| 5,819,084 A | 10/1998 | Shapiro et al. |
| 5,825,869 A | 10/1998 | Brooks et al. ............... 379/265 |
| 5,826,039 A | 10/1998 | Jones |
| 5,828,747 A | 10/1998 | Fisher et al. ................. 379/309 |
| 5,836,011 A | 11/1998 | Hambrick et al. |
| 5,838,968 A | 11/1998 | Culbert |
| 5,839,117 A | 11/1998 | Cameron et al. ............... 705/27 |
| 5,864,874 A | 1/1999 | Shapiro |
| 5,875,437 A | 2/1999 | Atkins ......................... 705/40 |
| 5,880,720 A | 3/1999 | Iwafune et al. ............... 345/327 |
| 5,881,238 A | 3/1999 | Aman et al. |
| 5,884,032 A | 3/1999 | Bateman et al. ........ 395/200.34 |
| 5,889,956 A | 3/1999 | Hauser et al. |
| 5,897,622 A | 4/1999 | Blinn et al. .................... 705/26 |
| 5,903,641 A | 5/1999 | Tonisson ..................... 379/266 |
| 5,903,877 A | 5/1999 | Berkowitz et al. ............. 705/26 |
| 5,905,793 A | 5/1999 | Flockhart et al. ............ 379/266 |
| 5,909,669 A | 6/1999 | Havens |
| 5,911,134 A | 6/1999 | Castonguay et al. |
| 5,914,951 A | 6/1999 | Bentley et al. |
| 5,915,012 A | 6/1999 | Miloslavsky |
| 5,923,745 A | 7/1999 | Hurd |
| 5,926,538 A | 7/1999 | Deryugin et al. |
| 5,930,786 A | 7/1999 | Carino, Jr. et al. |
| 5,937,051 A | 8/1999 | Hurd et al. |
| 5,937,402 A | 8/1999 | Pandit |
| 5,940,496 A | 8/1999 | Gisby et al. |
| 5,943,416 A | 8/1999 | Gisby ......................... 379/265 |
| 5,948,065 A | 9/1999 | Eilert et al. |
| 5,960,073 A | 9/1999 | Kikinis et al. |
| 5,963,635 A | 10/1999 | Szlam et al. |
| 5,963,911 A | 10/1999 | Walker et al. |
| 5,970,132 A | 10/1999 | Brady |
| 5,974,135 A | 10/1999 | Breneman et al. |
| 5,974,462 A | 10/1999 | Aman et al. |
| 5,982,873 A | 11/1999 | Flockhart et al. ............ 379/266 |
| 5,987,117 A | 11/1999 | McNeil et al. |
| 5,991,392 A | 11/1999 | Miloslavsky |
| 5,996,013 A | 11/1999 | Delp et al. |
| 5,999,963 A | 12/1999 | Bruno et al. |
| 6,000,832 A | 12/1999 | Franklin et al. ........ 364/479.02 |
| 6,011,844 A | 1/2000 | Uppaluru et al. |
| 6,014,437 A | 1/2000 | Acker et al. |
| 6,031,896 A | 2/2000 | Gardell et al. |
| 6,038,293 A | 3/2000 | McNerney et al. |
| 6,038,296 A | 3/2000 | Brunson et al. |
| 6,044,144 A | 3/2000 | Becker et al. |
| 6,044,205 A | 3/2000 | Reed et al. ............. 395/200.31 |
| 6,044,355 A | 3/2000 | Crockett et al. |
| 6,049,547 A | 4/2000 | Fisher et al. ................. 370/412 |
| 6,049,779 A | 4/2000 | Berkson |
| 6,052,723 A | 4/2000 | Ginn |
| 6,055,308 A | 4/2000 | Miloslavsky et al. |
| 6,064,730 A | 5/2000 | Ginsberg .................... 379/265 |
| 6,064,731 A | 5/2000 | Flockhart et al. ............ 379/265 |
| 6,084,954 A | 7/2000 | Harless et al. ............... 379/140 |
| 6,088,441 A | 7/2000 | Flockhart et al. ............ 379/265 |
| 6,108,670 A | 8/2000 | Weida et al. |
| 6,115,462 A | 9/2000 | Servi et al. |
| 6,128,304 A | 10/2000 | Gardell et al. |
| 6,151,571 A | 11/2000 | Pertrushin ................... 704/209 |
| 6,154,769 A | 11/2000 | Cherkasova et al. |
| 6,163,607 A | 12/2000 | Bogart et al. ................ 379/266 |
| 6,173,053 B1 | 1/2001 | Bogart et al. ................ 379/266 |
| 6,175,564 B1 | 1/2001 | Miloslavsky et al. |
| 6,178,441 B1 | 1/2001 | Elnozahy |
| 6,185,292 B1 | 2/2001 | Miloslavsky |
| 6,185,603 B1 | 2/2001 | Henderson et al. |
| 6,192,122 B1 | 2/2001 | Flockhart et al. ............ 379/266 |
| 6,215,865 B1 | 4/2001 | McCalmont |
| 6,226,377 B1 | 5/2001 | Donaghue, Jr. |
| 6,229,819 B1 | 5/2001 | Darland et al. |
| 6,230,183 B1 | 5/2001 | Yocom et al. |

| Patent | Date | Inventor | Class |
|---|---|---|---|
| 6,233,333 B1 | 5/2001 | Dezonmo | |
| 6,240,417 B1 | 5/2001 | Eastwick | |
| 6,259,969 B1 | 7/2001 | Tackett et al. | 700/264 |
| 6,263,359 B1 | 7/2001 | Fong et al. | |
| 6,272,544 B1 | 8/2001 | Mullen | |
| 6,275,806 B1 | 8/2001 | Pertrushin | 704/272 |
| 6,275,812 B1 | 8/2001 | Haq et al. | |
| 6,275,991 B1 | 8/2001 | Erlin | 725/141 |
| 6,278,777 B1 | 8/2001 | Morley et al. | 379/265 |
| 6,292,550 B1 | 9/2001 | Burritt | 379/201 |
| 6,295,353 B1 | 9/2001 | Flockhart et al. | 379/265 |
| 6,298,062 B1 | 10/2001 | Gardell et al. | |
| 6,307,931 B1 | 10/2001 | Vaudreuil | |
| 6,324,282 B1 | 11/2001 | McIllwaine et al. | |
| 6,332,081 B1 | 12/2001 | Do | |
| 6,339,754 B1 | 1/2002 | Flanagan et al. | |
| 6,353,810 B1 | 3/2002 | Petrushin | 704/236 |
| 6,356,632 B1 | 3/2002 | Foster et al. | |
| 6,360,222 B1 | 3/2002 | Quinn | |
| 6,366,666 B2 | 4/2002 | Bengston et al. | |
| 6,366,668 B1 | 4/2002 | Borst et al. | 379/266.04 |
| 6,389,028 B1 | 5/2002 | Bondarenko et al. | 370/401 |
| 6,389,132 B1 | 5/2002 | Price et al. | 379/265 |
| 6,389,400 B1 | 5/2002 | Bushey et al. | 705/7 |
| 6,411,682 B1 | 6/2002 | Fuller et al. | |
| 6,424,709 B1 | 7/2002 | Doyle et al. | |
| 6,426,950 B1 | 7/2002 | Mistry | |
| 6,427,137 B2 | 7/2002 | Petrushin | 704/273 |
| 6,430,282 B1 | 8/2002 | Bannister et al. | 379/211.02 |
| 6,434,230 B1 | 8/2002 | Gabriel | |
| 6,446,092 B1 | 9/2002 | Sutter | |
| 6,449,356 B1 | 9/2002 | Dezonno | 379/265.01 |
| 6,449,358 B1 | 9/2002 | Anisimov et al. | |
| 6,449,646 B1 | 9/2002 | Sikora et al. | |
| 6,453,038 B1 | 9/2002 | McFarlane et al. | 379/265.05 |
| 6,463,148 B1 | 10/2002 | Brady | |
| 6,463,346 B1 | 10/2002 | Flockhart et al. | 700/102 |
| 6,463,415 B2 | 10/2002 | St. John | 704/273 |
| 6,463,471 B1 | 10/2002 | Dreke et al. | |
| 6,480,826 B2 | 11/2002 | Pertrushin | 704/270 |
| 6,490,350 B2 | 12/2002 | McDuff et al. | |
| 6,535,600 B1 | 3/2003 | Fisher et al. | 379/265.12 |
| 6,535,601 B1 | 3/2003 | Flockhart et al. | |
| 6,553,114 B1 * | 4/2003 | Fisher et al. | 379/265.12 |
| 6,556,974 B1 | 4/2003 | D'Alessandro | |
| 6,560,330 B2 | 5/2003 | Gabriel | |
| 6,560,649 B1 | 5/2003 | Mullen et al. | |
| 6,560,707 B2 | 5/2003 | Curtis et al. | |
| 6,563,920 B1 | 5/2003 | Flockhart et al. | |
| 6,571,285 B1 | 5/2003 | Groath et al. | |
| 6,574,599 B1 * | 6/2003 | Lim et al. | 704/270 |
| 6,574,605 B1 | 6/2003 | Sanders et al. | |
| 6,597,685 B2 | 7/2003 | Miloslavsky et al. | 370/352 |
| 6,603,854 B1 | 8/2003 | Judkins et al. | |
| 6,604,084 B1 | 8/2003 | Powers et al. | |
| 6,614,903 B1 | 9/2003 | Flockhart et al. | |
| 6,650,748 B1 | 11/2003 | Edwards et al. | |
| 6,668,167 B2 | 12/2003 | McDowell et al. | |
| 6,675,168 B2 | 1/2004 | Shapiro et al. | |
| 6,700,967 B2 | 3/2004 | Kleinoder et al. | |
| 6,704,409 B1 | 3/2004 | Dilip et al. | |
| 6,707,903 B2 | 3/2004 | Burok et al. | |
| 6,711,253 B1 | 3/2004 | Prabhaker | |
| 6,735,299 B2 | 5/2004 | Krimstock et al. | |
| 6,735,593 B1 | 5/2004 | Williams | |
| 6,738,462 B1 | 5/2004 | Brunson | |
| 6,744,877 B1 | 6/2004 | Edwards | |
| 6,754,333 B1 | 6/2004 | Flockhart et al. | |
| 6,757,362 B1 | 6/2004 | Cooper et al. | |
| 6,766,326 B1 | 7/2004 | Cena | |
| 6,775,377 B2 | 8/2004 | McIllwaine et al. | |
| 6,785,666 B1 | 8/2004 | Nareddy et al. | |
| 6,822,945 B2 | 11/2004 | Petrovykh | |
| 6,829,348 B1 * | 12/2004 | Schroeder et al. | 379/265.09 |
| 6,839,735 B2 | 1/2005 | Wong et al. | |
| 6,842,503 B1 | 1/2005 | Wildfeuer | |
| 6,847,973 B2 | 1/2005 | Griffin et al. | |
| 6,898,190 B2 | 5/2005 | Shtivelman et al. | |
| 6,915,305 B2 | 7/2005 | Subramanian et al. | |
| 6,947,988 B1 | 9/2005 | Saleh | |
| 6,968,052 B2 | 11/2005 | Wullert, II | |
| 6,981,061 B1 | 12/2005 | Sakakura | |
| 6,985,901 B1 | 1/2006 | Sachse et al. | |
| 6,988,126 B2 | 1/2006 | Wilcock et al. | |
| 7,010,542 B2 | 3/2006 | Trappen et al. | |
| 7,020,254 B2 | 3/2006 | Phillips | |
| 7,035,808 B1 | 4/2006 | Ford | |
| 7,035,927 B2 | 4/2006 | Flockhart et al. | |
| 7,039,176 B2 | 5/2006 | Borodow et al. | |
| 7,062,031 B2 | 6/2006 | Becerra et al. | |
| 7,076,051 B2 | 7/2006 | Brown et al. | |
| 7,100,200 B2 | 8/2006 | Pope et al. | |
| 7,110,525 B1 | 9/2006 | Heller et al. | |
| 7,117,193 B1 | 10/2006 | Basko et al. | |
| 7,136,873 B2 | 11/2006 | Smith et al. | |
| 7,149,733 B2 | 12/2006 | Lin et al. | |
| 7,155,612 B2 | 12/2006 | Licis | |
| 7,162,469 B2 | 1/2007 | Anonsen et al. | |
| 7,165,075 B2 | 1/2007 | Harter et al. | |
| 7,170,976 B1 | 1/2007 | Keagy | |
| 7,170,992 B2 | 1/2007 | Knott et al. | |
| 7,177,401 B2 | 2/2007 | Mundra et al. | |
| 7,200,219 B1 | 4/2007 | Edwards et al. | |
| 7,203,655 B2 | 4/2007 | Herbert et al. | |
| 7,212,625 B1 * | 5/2007 | McKenna et al. | 379/266.01 |
| 7,215,744 B2 * | 5/2007 | Scherer | 379/88.19 |
| 7,246,371 B2 | 7/2007 | Diacakis et al. | |
| 7,257,597 B1 | 8/2007 | Pryce et al. | |
| 7,266,508 B1 * | 9/2007 | Owen et al. | 705/11 |
| 7,283,805 B2 | 10/2007 | Agrawal | |
| 7,299,259 B2 | 11/2007 | Petrovykh | |
| 7,376,127 B2 | 5/2008 | Hepworth et al. | |
| 7,392,402 B2 | 6/2008 | Suzuki | |
| 7,409,423 B2 | 8/2008 | Horvitz et al. | |
| 7,418,093 B2 | 8/2008 | Knott et al. | |
| 2001/0056349 A1 | 12/2001 | St. John | 704/270 |
| 2002/0002460 A1 | 1/2002 | Pertrushin | 704/270 |
| 2002/0002464 A1 | 1/2002 | Petrushin | 704/275 |
| 2002/0010587 A1 | 1/2002 | Pertrushin | 704/275 |
| 2002/0019829 A1 | 2/2002 | Shapiro | |
| 2002/0021307 A1 | 2/2002 | Glenn et al. | |
| 2002/0035605 A1 | 3/2002 | McDowell et al. | |
| 2002/0038422 A1 | 3/2002 | Suwamoto et al. | |
| 2002/0065894 A1 | 5/2002 | Dalal et al. | |
| 2002/0076010 A1 | 6/2002 | Sahai | |
| 2002/0085701 A1 | 7/2002 | Parsons et al. | |
| 2002/0087630 A1 | 7/2002 | Wu | |
| 2002/0012186 A1 | 8/2002 | Ford et al. | |
| 2002/0112186 A1 | 8/2002 | Ford et al. | |
| 2002/0116336 A1 | 8/2002 | Diacakis et al. | |
| 2002/0116461 A1 | 8/2002 | Diacakis et al. | |
| 2002/0118816 A1 | 8/2002 | Flockhart et al. | 379/265.12 |
| 2002/0181692 A1 | 12/2002 | Flockhart et al. | 379/265.02 |
| 2002/0194002 A1 | 12/2002 | Petrushin | 704/270 |
| 2003/0028621 A1 | 2/2003 | Furlong et al. | |
| 2003/0073440 A1 | 4/2003 | Mukherjee et al. | |
| 2003/0093465 A1 | 5/2003 | Banerjee et al. | |
| 2003/0108186 A1 | 6/2003 | Brown et al. | |
| 2003/0123642 A1 | 7/2003 | Alvarado et al. | |
| 2003/0144900 A1 | 7/2003 | Whitmer | |
| 2003/0144959 A1 | 7/2003 | Makita | |
| 2003/0152212 A1 | 8/2003 | Burok et al. | |
| 2003/0174830 A1 | 9/2003 | Boyer et al. | |
| 2003/0177017 A1 * | 9/2003 | Boyer et al. | 705/1 |
| 2003/0231757 A1 | 12/2003 | Harkreader et al. | |
| 2004/0008828 A1 * | 1/2004 | Coles et al. | 379/88.01 |

| | | | |
|---|---|---|---|
| 2004/0015496 A1 | 1/2004 | Anonsen | |
| 2004/0015506 A1 | 1/2004 | Anonsen et al. | |
| 2004/0054743 A1 | 3/2004 | McPartlan et al. | |
| 2004/0057569 A1 | 3/2004 | Busey et al. | |
| 2004/0103324 A1 | 5/2004 | Band | |
| 2004/0109555 A1* | 6/2004 | Williams | 379/265.02 |
| 2004/0138944 A1 | 7/2004 | Whitacre et al. | |
| 2004/0162998 A1 | 8/2004 | Tuomi et al. | |
| 2004/0202309 A1 | 10/2004 | Baggenstoss et al. | |
| 2004/0203878 A1 | 10/2004 | Thomson | |
| 2004/0210475 A1 | 10/2004 | Starnes et al. | |
| 2004/0260706 A1 | 12/2004 | Anonsen et al. | |
| 2005/0021529 A1* | 1/2005 | Hodson et al. | 707/100 |
| 2005/0027612 A1 | 2/2005 | Walker et al. | |
| 2005/0043986 A1* | 2/2005 | McConnell et al. | 705/11 |
| 2005/0044375 A1 | 2/2005 | Paatero et al. | |
| 2005/0071211 A1 | 3/2005 | Flockhart et al. | |
| 2005/0071212 A1 | 3/2005 | Flockhart et al. | |
| 2005/0071241 A1 | 3/2005 | Flockhart et al. | |
| 2005/0071844 A1 | 3/2005 | Flockhart et al. | |
| 2005/0091071 A1 | 4/2005 | Lee | |
| 2005/0125432 A1 | 6/2005 | Lin et al. | |
| 2005/0125458 A1 | 6/2005 | Sutherland et al. | |
| 2005/0138064 A1 | 6/2005 | Trappen et al. | |
| 2005/0154708 A1 | 7/2005 | Sun | |
| 2005/0182784 A1 | 8/2005 | Trappen et al. | |
| 2005/0289446 A1 | 12/2005 | Moncsko et al. | |
| 2006/0004686 A1 | 1/2006 | Molnar et al. | |
| 2006/0007916 A1 | 1/2006 | Jones et al. | |
| 2006/0015388 A1 | 1/2006 | Flockhart et al. | |
| 2006/0056598 A1 | 3/2006 | Brandt et al. | |
| 2006/0135058 A1 | 6/2006 | Karabinis | |
| 2006/0178994 A1 | 8/2006 | Stolfo et al. | |
| 2006/0242160 A1 | 10/2006 | Kanchwalla et al. | |
| 2006/0256957 A1 | 11/2006 | Fain et al. | |
| 2006/0271418 A1 | 11/2006 | Hackbarth et al. | |
| 2007/0038632 A1 | 2/2007 | Engstrom | |
| 2007/0064912 A1 | 3/2007 | Kagan et al. | |
| 2007/0083572 A1 | 4/2007 | Bland et al. | |
| 2007/0112953 A1 | 5/2007 | Barnett | |
| 2007/0127643 A1 | 6/2007 | Keagy | |
| 2007/0192414 A1 | 8/2007 | Chen et al. | |
| 2007/0201311 A1 | 8/2007 | Olson | |
| 2007/0201674 A1 | 8/2007 | Annadata et al. | |
| 2007/0230681 A1 | 10/2007 | Boyer et al. | |
| 2008/0056165 A1 | 3/2008 | Petrovykh | |
| 2009/0193050 A1 | 7/2009 | Olson | |

FOREIGN PATENT DOCUMENTS

| | | |
|---|---|---|
| CA | 2174762 | 6/1995 |
| EP | 0 501 189 A2 | 9/1992 |
| EP | 0 740 450 A2 | 10/1996 |
| EP | 0 772 335 A2 | 5/1997 |
| EP | 0770967 | 5/1997 |
| EP | 0 829 996 A2 | 3/1998 |
| EP | 0 855 826 A2 | 7/1998 |
| EP | 0 863 651 A2 | 9/1998 |
| EP | 0 866 407 A1 | 9/1998 |
| EP | 899673 A2 | 3/1999 |
| EP | 998108 A1 | 5/2000 |
| EP | 1035718 | 9/2000 |
| EP | 1091307 A2 | 4/2001 |
| EP | 1150236 | 10/2001 |
| GB | 2 273 418 | 6/1994 |
| GB | 2 290 192 A | 12/1995 |
| JP | 2001-053843 | 2/2001 |
| JP | 2006-054864 | 2/2006 |
| WO | WO 96/07141 | 3/1996 |
| WO | WO 97/28635 | 8/1997 |
| WO | WO 98/56207 | 12/1998 |
| WO | WO 99/17522 | 4/1999 |
| WO | WO 01/80094 | 10/2001 |
| WO | WO 02/099640 | 12/2002 |

OTHER PUBLICATIONS

U.S. Appl. No. 10/815,556, filed Mar. 31, 2004, Kiefhaber.

Doo-Hyun Kim et al. "Collaborative Multimedia Middleware Architecture and Advanced Internet Call Center"; ProceedingsInternational Conference on Information Networking (Jan. 31, 2001), pp. 246-250.

Presentation by Victor Zue, *The MIT Ox90ygen Project*, MIT Laboratory for Computer Science (Apr. 25-26, 2000).

MIT Project Oxygen, *Pervasive, Human-Centered Computing* (MIT Laboratory for Computer Science) (Jun. 2000).

E. Noth et al., "Research Issues for the Next Generation Spoken"; University of Erlangen-Nuremberg, Bavarian Research Centre for Knowledge-Based Systems, at http://www5.Informatik.uni-erlangen.de/literature/psdir/1999/Noeth99:RIF.ps.gz.

L.F. Lamel and J.L. Gauvaln, Language Identification Using Phone-Based Acoustic Likelihoods, ICASSP-94, 4 pages.

John H.L. Hansen and Levent M. Arslan, *Foreign Accent Classificatino Using Source Generator Based Prosodic Features*, IEEE Proc. ICASSP, vol. 1, pp. 836-839, Detroit USA (May 1995).

Levent M. Arslan and John H.L. Hansen, *Language Accent Classification in American English*, Robust Speech Processing Laboratory, Duke University Department of Electrical Engineering, Durham, NC, Technical Report RSPL-96-7, revised Jan. 29, 1996.

Levent M. Arslan, *Foreign Accent Classification in American English*, Department of Electrical Computer Engineering, Duke University. Thesis pp. 1-200 (1996).

No Author, "When Talk Isn't Cheap" Sm@rt Reseller, v. 3, n. 13 (Apr. 3, 2000), p. 50.

No Author, "eGain's Commerce 2000 Platform Sets New Standard for eCommerce Customer Communications" Business Wire (Nov. 15, 1999).

U.S. Appl. No. 09/235,065, Denton et al.

U.S. Appl. No. 10/683,039, filed Oct. 10, 2003, Flockhart et al.

Microsoft Office Animated Help Tool.

"Product Features," Guide to Call Center Automation, Brock Control Systems, Inc., Activity Managers Series™, Section 5—Company B120, p. 59, 1992.

"Product Features," Guide to Call Center Automation, CRC Information Systems, Inc., Tel-Athena, Section 5—Company C520, p. 95, 1992.

Dawson, "NPRI's Powerguide, Software Overview" Call Center Magazine (Jun. 1993), p. 85.

"Applications, NPRI's Predictive Dialing Package," Computer Technology (Fall 1993), p. 86.

"Call Center Software You Can't Outgrow," Telemarketing® (Jul. 1993), p. 105.

"Vast™, Voicelink Application Software for Teleservicing®," System Manager User's Guide, Digital Systems (1994), pp. ii, vii-ix, 1-2, 2-41 through 2-77.

Geotel Communications Corporation Web site printout entitled "Intelligent CallRouter" Optimizing the Interaction Between Customers and Answering Resources. 6 pages.

Avaya, Inc. Business Advocate Product Summary, at http://www.avaya.com, downloaded on Feb. 15, 2003, Avaya, Inc. 2003, 3 pages.

Avaya, Inc. Business Advocate Options, at http://www.avaya.com, downloaded on Feb. 15, 2003, Avaya, Inc. 2003.

Avaya, Inc. CentreVu Advocate, Release 9, User Guide, Dec. 2000.

"Internet Protocol Addressing," available at http://samspade.org/d/ipdns.html, downloaded Mar. 31, 2003, 9 pages.

"Domain Name Services," available at http://www.pism.com/chapt09/chapt09.html, downloaded Mar. 31, 2003, 21 pages.

Bellsouth Corp, "Frequently Asked Questions—What is a registrar?," available at https://registration.bellsouth.net/NASApp/DNSWebUI/FAQ.jsp, downloaded Mar. 31, 2003, 4 pages.

S. Ahmed, "A Scalable Byzantine Fault Tolerant Secure Domain Name System," thesis submitted to MIT Dept of Electrical Engineering & Computer Science, Jan, 22, 2001, 101 pages.

Coles, Scott, "A Guide for Ensuring Service Quality In IP Voice Networks," Avaya, Inc., 2002, pp. 1-17.

Avaya, Inc., "The Advantages of Load Balancing in the Multi-Call Center Enterprise," Avaya, Inc., 2002, 14 pages.
Foster, Robin, et al., "Avaya Business Advocate and its Relationship to Multi-Site Load Balancing Applications," Avaya, Inc., Mar. 2002, 14 pages.
Chavez, David, et al., "Avaya MultiVantage Software: Adapting Proven Call Processing for the Transition to Converged IP Networks," Avaya, Inc., Aug. 2002.
Avaya, Inc., "Voice Over IP Via Virtual Private Networks: An Overview," Avaya, Inc., Feb. 2001, 9 pages.
Avaya, Inc., "Better Implementation of IP in Large Networks," Avaya, Inc. 2002, 14 pages.
Stevenson et al.; "Name Resolution in Network and Systems Management Environments"; http://netman.cit.buffalo.edu/Doc/DStevenson/NR-NMSE.html; 16 pages.
"Still Leaving It To Fate?: Optimizing Workforce Management", Durr, William Jr., Nov. 2001.
U.S. Appl. No. 10/861,193, filed Jun. 3, 2004, Flockhart et al.
U.S. Appl. No. 10/946,638, filed Sep. 20, 2004, Flockhart et al.
U.S. Appl. No. 11/087,290, filed Mar. 22, 2005, Michaelis.
U.S. Appl. No. 11/242,687, filed Oct. 3, 2005, Krimstock et al.
US 6,537,685, Mar. 18, 2003, Fisher et al. (withdrawn).
U.S. Appl. No. 11/199,828, filed Aug. 8, 2005, Bland et al.
U.S. Appl. No. 11/245,724, filed Oct. 6, 2005, Flockhart et al.
U.S. Appl. No. 11/517,646, filed Sep. 7, 2006, Hackbarth et al.
U.S. Appl. No. 11/536,456, filed Sep. 28, 2006, Hackbarth et al.
U.S. Appl. No. 11/861,857, filed Sep. 26, 2007, Tendick et al.
U.S. Appl. No. 12/242,916, filed Oct. 1, 2008, Kiefhaber et al.
A.A. Vaisman et al., "A Temporal Query Language for OLAP: Implementation and a Case Study", LNCS, 2001, vol. 2397, 36 pages.
A.B. Schwarzkopf, "Dimensional Modeling for a Data Warehouse", date unknown, 18 pages.
An Expert's Guide to Oracle Technology blog, My Personal Dictionary, Lewis R. Cunningham, posted Mar. 31, 2005, http://blogs.ittoolbox.com/oracle'guide/archives003684.asp, 4 pages.
Andy Zmolek; "Simple and Presence: Enterprise Value Propositions," Avaya presentation, 16 pages, presented Jan. 24, 2002.
Aspect—"Analysis and Reporting," http://aspect.com/products/analysis/index.cfm, (Copyright 2005) (1page).
Aspect—"Call Center Reports," http://aspect.com/products/analysis/ccreporting.cfm, (Copyright 2005) (2 pages).
Aspect—"Performance Optimization," http://aspect.com/products/wfm/performanceopt.cfm?section=performanceopt, (Copyright 2005) (1page).
Atkins et a.l; "Common Presence and Instant Messaging: Message Format," Network Working Group (Jan. 9, 2003), available at http://www.ietf.org/internet-drafts/draft-ietf-impp-cpim-msgfmt-08.txt, 31 pages.
Avaya—"Avaya and Blue Pumpkin—Providing Workforce Optimization Solutions" (Copyright 2004) (3 pages).
Avaya—"Avaya and Texas Digital Systems—Providing Real-time Access to Call Statistics" (Copyright 2004) (3 pages).
Avaya—"Avaya Basic Call Management System Reporting Desktop" (Copyright 2002) (4 pages).
Avaya—"Avaya Call Management System" (Copyright 2003) (3 pages).
Avaya—"Basic Call Management System Reporting Desktop," Product Description, http://www.avaya.com/gcm/master-usa/en-us/products/offers/bcmrs_desktop.htm (Copyright 2005) (2 pages).
Avaya—"Basic Call Management System Reporting Desktop," Product Features, http://www.avaya.com/gcm/master-usa/en-us/products/offers/bcmrs_desktop.htm (Copyright 2005) (2 pages).
Avaya—"Basic Call Management System Reporting Desktop," Product Overview, http://www.avaya.com/gcm/master-usa/en-us/products/offers/bcmrs_desktop.htm (Copyright 2005) (2 pages).
Avaya—"Basic Call Management System Reporting Desktop," Product Technical, http://www.avaya.com/gcm/master-usa/en-us/products/offers/bcmrs_desktop.htm (Copyright 2005) (2 pages).
Avaya—"Call Management System," Product Description, http://www.avaya.com/gcm/master-usa/en-us/products/offers/call_management_system.htm (Copyright 2005) (2 pages).
Avaya—"Call Management System," Product Features, http://www.avaya.com/gcm/master-usa/en-us/products/offers/call_management_system.htm (Copyright 2005) (3 pages).
Avaya—"Call Management System," Product Overview, http://www.avaya.com/gcm/master-usa/en-us/products/offers/call_management_system.htm (Copyright 2005) (2 pages).
Avaya—"Call Management System," Product Technical, http://www.avaya.com/gcm/master-usa/en-us/products/offers/call_management_system.htm (Copyright 2005) (2 pages).
Avaya—"Multi Channel Product Authorization," (PA) Version 5.0, (Nov. 2003) (6 pages).
Avaya IQ "Introducing Reporting And Analytics As You Designed It", 2007, 4 pages.
Berners-Lee et al.; "Uniform Resource Identifiers (URI); Generic Syntax," Network Working Group, Request for Comments 2396 (Aug. 1998), 38 pages.
Bill Michael, "The Politics of Naming" www.cConvergence.com (Jul. 2001) pp. 31-35.
Cherry, "Anger Management," IEEE Spectrum (Apr. 2005) (1 page).
ComputerWorld, ETL, M. Songini, at http://www.computerworld.com/databasetopics/businessintelligence/datawarehouse/story/..., copyright 2005, 5 pages.
Creating and Using Data Warehouse Dimension Tables (Microsoft) copyright 2005, http://msdn.microsoft.com/library/en-us/createdw/createdw_10kz.asp?frame=true, 3 pages.
Creating and Using Data Warehouse-Using Dimensional Modeling (Microsoft) downloaded May 18, 2005 http://msdn.microsoft.com/library/en-us/createdw/createdw_39z.asp?frame=true 1 page.
Crocker et al.; "Common Presence and Instant Messaging (CPIM)," Network Working Group (Aug. 14, 2002), available at http://www.ietf.org/internet-drafts/draft-ietf-impp-cpim-03.txt, 33 pages.
CS 345: Topics in Data Warehousing, Oct. 5, 2004, 36 pages.
D. Smith, "Data Model Overview Modeling for the Enterprise While Serving the Individual", Teredata Global Sales Support, 2007, 33 pages.
Data Warehouse—Surrogate Keys, Keep Control Over Record Identifiers by Generating New Keys for the Data Warehouse, Ralph Kimball, May 1998, 4 pages.
Data Warehouse Designer—Design Constraints and Unavoidable Realities, No design Problem in School was This Hard, Ralph Kimball, Sep. 3, 2002, 3 pages.
Data Warehouse Designer—An Engineer' s View—Its' Worthwhile to Remind Ourselves Why We Build Data Warehouses the Way We Do, Ralph Kimball, Jul. 26, 2002, 3 pages.
Data Warehouse Designer—Divide and Conquer, Build Your Data Warehouse One Piece at a Time, Ralph Kimball, Oct. 30, 2002, 3 pages.
Data Warehouse Designer—TCO Starts with the End User, Ralph Kimball, May 13, 2003, http://www.intelligententerprise.com/030513/608warehouse1_1.jhtml?_requestid=598425, 3 pages.
Data Warehouse Designer—The Soul of the Data Warehouse, Part One: Drilling Down, Ralph Kimball, Mar. 20, 2003, 3 pages.
Data Warehouse Designer—The Soul of the Data Warehouse, Part Three: Handling Time, Ralph Kimball, Apr. 22, 2003, 3 pages.
Data Warehouse Designer—The Soul of the Data Warehouse, Part Two: Drilling Across, Ralph Kimball, Apr. 5, 2003, 3 pages.
Data Warehouse Designer—Two Powerful Ideas, The Foundation for Modern Data Warehousing, Ralph Kimball, Sep. 17, 2002, 3 pages.
Data Warehouse Designer Fact Tables and Dimension, Jan. 1, 2003, http://www.inteeigententerprise.com/030101/602warehouse1_1.jhtml, Ralph Kimball, 3 page.
Dawson et al.; "Vcard MIME Directory Profile," Network Working Group (Sep. 1998), available at http://www.ietf.org/rfc/rfc2426.txt?number=2426, 40 pages.
Day et al.; "A Model for Presence and Instant Messaging," Network Working Group (Feb. 2000), available at http://www.ietf.org/rfc/r1c2778.txt?number=2778, 16 pages.
Day et al.; "Instant Messaging/Presence Protocol Requirements," Network Working Group (Feb. 2000), available at http://www.ietf.org/rfc/rfc2779.txt?number=2779, 25 pages.
Dillion, "Renaming fields and tracing dependencies", available at http://allenbrowne.com/ser-41.html, Nov. 2003, updated May 2006, 1 page.

DMReview—Business Dimensional Modeling: The Logical Next Step: Translating the BDM, Laura Reeves, published May 2004, 4 pages.
E. Veerman, "Designing A Dimensional Model", date unknown, 38 pages.
Fielding et al.; "Hypertext Transfer Protocol—HTTP/1.1," Network Working Group, Request for Comments 2068 (Jan. 1997), 152 pages.
Fundamentals of Data Warehousing—Unit 3—Dimensional Modeling, Fundamentals of Data Warehousing, copyright 2005—Evolve Computer Solutions, 55 pages.
G. Klyne; "A Syntax for Describing Media Feature Sets," Network Working Group (Mar. 1999), available at http://www.ietf.org/rfc/rfc2533.txt?number=2533, 35 pages.
G. Klyne; "Protocol-independent Content Negotiation Framework," Network Working Group (Sep. 1999), available at http://www.ietf.org/rfc/rfc2703.txt?number=2703, 19 pages.
G. Wiederhold, "Mediation to Deal with Heterogeneous Data Sources", Stanford University, Jan. 1999, 19 pages.
Glossary—Curlingstone Publishing, http://www.curlingstone.com/7002/7002glossary.html, downloaded May 24, 2005, 11 pages.
Gulbrandsen et al.; "A DNS RR for Specifying the Location of Services (DNS SRV)," Network Working Group (Feb. 2000), available at http://www.ietf.org/rfc/rfc2782.txt?number=2782, 12 pages.
Holtman et al.; "HTTP Remote Variant Selection Algorithm—RVSA/1.0," Network Working Group (Mar. 1998), available at http://www.ietf.org/rfc/rfc2296.txt?number=2296, 13 pages.
Holtman et al.; "Transparent Content Negotiation in HTTP," Network Working Group (Mar. 1998), available at http://www.ietf.org/rfc/rfc2295.txt?number=2295, 55 pages.
Intelligent Enterprise Magazine—Data Warehouse Designer: Fact Tables and Dimension, downloaded May 18, 2005, http://www.intelligententerprise.com/030101/602warehouse1_1.jhtml, 7 pages.
J. Cahoon, "Fast Development of a Data Warehouse Using MOF, CWM and Code Generation", CubeModel, May 22, 2006, 32 pages.
J.E. Bentley, "Metadata: Everyone Talks About It, But What Is It?", First Union National Bank, date unknown, 5 pages.
Kimball, et al., "Practical Techniques for Extracting, Cleaning, Conforming, and Delivering Data." The Data Warehouse ETL Toolkit. 2004. Ch. 5, pp. 170-174.
Kimball, et al., "The Complete Guide to Dimensional Modeling." The Data Warehouse Toolkit. 2nd Edition, 2002. Ch. 11, pp. 240-241.
L. Cabibbo et al., "An Architecture For Data Warehousing Supporting Data Independence And Interoperability", International Journal of Cooperative Information Systems, Nov. 2004, 41 pages.
Multi-Dimensional Modeling with BW ASAP for BW Accelerator Business Information Warehouse, copyright 2000, 71 pages.
Nice Systems—"Insight from Interactions," "Overwhelmed by the Amount of Data at your Contact Center?" http://www.nice.com/products/multimedia/analyzer.php, (Printed May 19, 2005) (2 pages).
Nice Systems—"Multimedia Interaction Products," "Insight from Interactions," http://www.nice.com/products/multimedia/contact_centers.php (Printed May 19, 2005) (3 pages).
Nortel—"Centrex Internet Enabled Call Centers," http://www.products.nortel.com/go/product_assoc.jsp?segld=0&parlD=0&catID=-9191&rend_id... (Copyright 1999-2005) (1page).
O. Boussaid et al., "Integration and dimensional modeling approaches for complex data warehousing", J. Global Optimization, vol. 37, No. 4, Apr. 2007, 2 pages.
Richard Shockey, "ENUM: Phone Numbers Meet the Net" www.cConvergence.com (Jul. 2001) pp. 21-30.
Rose et al..; "The APEX Presence Service," Network Working Group (Jan. 14, 2002), available at http://www.ietf.org/internet-drafts/draft-ietf-apex-presence-06.txt, 31 pages.
Snape, James, "Time Dimension and Time Zones." 2004. pp. 1-10. http://www.jamessnape.me.uk/blog/CommentView,gui,79e910a1-0150-4452-bda3-e98d.
Sugano et al. ;"Common Presence and Instant Messaging (CPIM) Presence Information Data Format," Network Working Group (Dec. 2002), available at http://www.ietf.org/internet-drafts/draft-ietf-impp-cpim-pidf-07.txt, 26 pages.
Thayer Watkins, "Cost Benefit Analysis", 1999, San Jose State University Economics Department, Web Archive http://web.archive.org/web/19990225143131/http://www.sjsu.edu/faculty/watkins/cba.htm.
The Importance of Data Modeling as a Foundation for Business Insight, Larissa Moss and Steve Hoberman, copyright 2004, 38 pages.
"Avaya IQ—Building Upon the Strengths of CMS", White Paper, Feb. 2007, 11 pages.
"Call Center Recording for Call Center Quality Assurance", Voice Print International, Inc., available at http://www.voiceprintonline.com/call-center-recording.asp?ad_src=google&srch_trm=call_center_monitoring, date unknown, printed May 10, 2007, 2 pages.
"Dimensional database", Wikipedia, downloaded Aug. 30, 2007 (3 pages).
"Driving Model Agent Behaviors With Avaya IQ", White Paper, Apr. 2007, 12 pages.
"Kana—Contact Center Support", available at http://www.kana.com/solutions.php?tid=46, copyright 2006, 3 pages.
"Learn the structure of an Access database", available at http://office.microsoft.com/en-us/access/HA012139541033.aspx, site updated Nov. 13, 2007, pp. 1-4.
"Monitoring: OneSight Call Statistics Monitors", available at http://www.empirix.com/default.asp?action=article&ID=301, date unknown, printed May 10, 2007, 2 pages.
"Oracle and Siebel" Oracle, available at http://www.oracle.com/siebel/index.html, date unknown, printed May, 10, 2007, 2 pages.
Background of the Invention for the above-captioned application (previously provided).
Sarda, "Temporal Issues in Data Warehouse Systems", 1999, Database Applications in Non-Traditional Environments (DANTE'99), S. 27, DOI: 10.1109/DANTE.1999.844938.
Karakasidis A. "Queues for Active Data Warehousing", Jun. 17, 2005, Baltimore, MA, in Proceedings on Information Quality in Informational Systems (IQIS'2005), S.28-39, ISBN: 1-59593-160-0, DOI: 10.1109/DANTE.1999.844938.
Bischoff et al. "Data Ware House Building Method— practical advices telled by persons having experience and experts", Kyouritsu Shuppan Corp. May 30, 2000, first edition, pp. 197-216.
Seo, "akuto/FC shop sale assistant systme etc., compressing into halves the number of days for stock possession by a multi-bender EPR plus POS", Network Computing, Japan Licktelecom Corp., vol. 12, No. 4, Apr. 1, 2000, pp. 45-49.
Koutarou, "Building a Framework for EC using Hibernate, OSWorkflow", JAVA Press, Japan, Gujutsu Hyouron Company, vol. 25, 2004, pp. 132-147.
Microsoft R Access 97 for Windows R Application development guide, Ver. 8.0, Microsoft Corp., a first version, pp. 569-599.

* cited by examiner

CONTACT CENTER AND METHOD FOR TRACKING AND ACTING ON ONE AND DONE CUSTOMER CONTACTS

FIELD OF THE INVENTION

The present invention is directed generally to servicing a contactor in a contact center and specifically to routing or directing contacts to appropriate contact center resources.

BACKGROUND OF THE INVENTION

Contact centers, such as Automatic Call Distribution or ACD systems, are employed by many enterprises to service customer contacts. A typical contact center includes a switch and/or server to receive and route incoming packet-switched and/or circuit-switched contacts and one or more resources, such as human agents and automated resources (e.g., Interactive Voice Response (IVR) units), to service the incoming contacts. Contact centers distribute contacts, whether inbound or outbound, for servicing to any suitable resource according to predefined criteria. In many existing systems, the criteria for servicing the contact from the moment that the contact center becomes aware of the contact until the contact is connected to an agent are customer-specifiable (i.e., programmable by the operator of the contact center), via a capability called contact vectoring. Normally in present-day ACDs when the ACD system's controller detects that an agent has become available to handle a contact, the controller identifies all predefined contact-handling skills of the agent (usually in some order of priority) and delivers to the agent the highest-priority oldest contact that matches the agent's highest-priority skill. Generally, the only condition that results in a contact not being delivered to an available agent is that there are no contacts waiting to be handled.

Most present-day contact-distribution algorithms focus on being "fair" to callers and to agents. This fairness is reflected by the standard first-in, first-out contact to most-idle-agent assignment algorithm. Skills-based routing improves upon this basic algorithm in that it allows each agent to be slotted into a number of agent groups based on the agent's skill types and levels.

The primary objective of call-distribution algorithms is to ultimately maximize contact center performance and profitability. That may involve minimizing cost, maximizing contact throughput, and/or maximizing revenue, among others. For example, when a new contact arrives, the contact should be handled by an agent who either has the ability to produce the most revenue or can handle the contact in the shortest amount of time. Also, when an agent becomes available to handle a new contact, the agent should handle either the contact that has the possibility of generating the most revenue or the contact which the agent is most efficient in handling.

An important consideration in minimizing contact center operating costs and maximizing contact center revenue is servicing a customer's needs in as few contacts as possible. Whether the contact center is sales or services repeated contacts by a customer to accomplish one transaction causes the contact center's costs of serving that customer to rise and service wait times to increase, which lowers contact center profitability and increases customer dissatisfaction, thereby lowering revenue. The challenge to contact center administrators is tracking whether a current contact is related to a prior contact and therefore is not "one-and-done". As a result of this challenge current contact centers do not measure the percentage of contacts that are "one-and-done"

Existing contact centers do allow for the tracking of "trouble" tickets (e.g., WebQ/QQ™ business application). These trouble ticket applications can retrieve open and closed trouble tickets and display them to agents. It may even be possible, through integration, to push the most recent trouble tickets to an agent upon delivering a contact. Existing contact centers, however, do not allow for the identification of a current contact that is associated with a prior contact by the same customer that was not "one-and-done" let alone making contact-handling decisions for the current contact based upon this identification to decrease the likelihood that the customer's needs will not be serviced in the current contact.

SUMMARY OF THE INVENTION

These and other needs are addressed by the various embodiments and configurations of the present invention. The present invention is directed generally to the tracking and use in contact center operations of instances of repetitive contacts by the same customer related to the same issue. As will be appreciated, the contacts can be inbound or outbound contacts or some combination thereof. For example, a second outbound/inbound contact can follow a first outbound/inbound contact or a second outbound/inbound contact can follow a first inbound/outbound contact.

In one embodiment, the present invention is directed to a contact center that includes:

(a) an input operable to receive a first contact from or initiate a first contact with a first customer;

(b) a selector operable (i) to determine whether the first contact is related to a previous contact with the first customer and (ii) when the first contact is related to another contact with the first customer, to service the contact differently than when the first contact is unrelated to another contact with the first customer; and/or (c) a repeat contact determining agent operable (i) to track, for a set of the plurality of agents over a selected or specified time period, a number of contacts serviced by the set of agents that are or are not related to a previous and/or subsequent contact serviced by the set of agents and (ii) to maintain, for the set of agents, an indicator indicating one or more of (a) a number of contacts serviced by the set of agents during the selected time period, that are not related to a previous and/or subsequent contact serviced by the set of agents and (b) a number of contacts, serviced by the set of agents during the selected time period, that are related to a previous and/or subsequent contact serviced by the set of agents.

The "relatedness" of another contact to a present or current contact is generally assumed to be present when the two contacts are related to the same issue and/or customer purpose or need. There are numerous techniques that may be used to identify related contacts, including information provided by the customer to a contact center resource, the presence of matching subject matter indicators for the two contacts, the timing of the two contacts, information received by the agent(s) servicing the contacts, transaction identifier, reservation number, a common number (customer number, issue tracking number, order number, or ticket number), and the like.

The contact(s) may be real-time or non-real-time contact(s). A real-time contact refers to a contact in which the contacting entity or customer is present during the waiting (or queuing) period and can choose to abandon or disconnect the contact if the contact is not serviced within an acceptable period. Common examples include voice contacts, VoIP, text-chat, video contacts, and the like. A non-real-time contact refers to a contact in which the contacting entity or customer is unable to abandon or disconnect the contact. Common examples include e-mail, fax, electronic or paper documents, webform submissions, voice messages, and the like.

The set of agents can have one or more agent members. The membership of the set can be defined based on one or more suitable criteria, such as skill(s), expertise, experience, and the like.

The related first and second contacts can be received on the same channel/communication medium or on different channels/communication media. For example, the first contact can be in the form of email and the second contact in the form of a live voice communication. The first and second contacts can alternatively both be in the form of emails or live voice communications.

The present invention can have several advantages when compared to conventional systems. For example, the contact center of the present invention can determine whether a current contact is related to a prior contact and whether the contact had to be served by multiple servers (e.g., agents) in the same transaction. This in turn permits the contact center to determine the number or percentage of contacts, on a contact center, agent-by-agent, or skill-by-skill basis that are or are not "one-and-done". This information can be important for at least two purposes. First, the information can be used to identify performance issues at the contact center or agent level. Agents taking longer to service contacts but having a higher one-and-done completion rate can now be recognized and suitably rewarded. In existing contact centers, such agents have been incorrectly viewed as being of less value to the contact center. The cause(s) of performance issues can also be identified using such information and appropriate actions taken to address the causes. Examples of possible causes of instances of repetitive related contacts include inadequate agent training, problem customers, product quality issues. Second, the information can be used to make a contact-handling decision for a current contact that is related to one or more previous contacts by the same customer. This ability can permit such repetitive contacts to receive different and/or better service than contacts unrelated to prior contacts, thereby decreasing rates of repetitive related contacts, increasing contact center performance efficiency and profitability, decreasing customer frustration dissatisfaction, and defection-leaving to take their business elsewhere, and increasing revenue from customer sales. In short, the present invention permits a contact center to measure itself and its resources against its one-and-done objectives and take appropriate action, on an agent or contact level, when the objective is not met.

The contact center can determine if a customer has a high rate of not one and done contacts and follow up with that customer to determine if there is an issue. The results can be used to identify not only one and done situations. For example, a customer may be contacting the contact center multiple times using the same purpose indicator when the customer is really dealing with different issues or the customer simply wants to "talk" to someone. The agents should not be negatively affected if the customer is "re-using" a purpose indicator or if the customer just needs someone to talk to. An example is the person who orders something everyday so that a UPS employee shows up every day; therefore, giving the person someone to talk to. The results of the inquiry could be used to help direct future contacts, such as directing the customer to lower cost agent resources (e.g., not human agents).

These and other advantages will be apparent from the disclosure of the invention(s) contained herein.

The above-described embodiments and configurations are neither complete nor exhaustive. As will be appreciated, other embodiments of the invention are possible utilizing, alone or in combination, one or more of the features set forth above or described in detail below.

DETAILED DESCRIPTION

The invention will be illustrated below in conjunction with an exemplary communication system. Although well suited for use with, e.g., a system having an ACD or other similar contact processing switch, the invention is not limited to use with any particular type of communication system switch or configuration of system elements. Those skilled in the art will recognize that the disclosed techniques may be used in any communication application in which it is desirable to provide improved contact processing.

Figure 1:
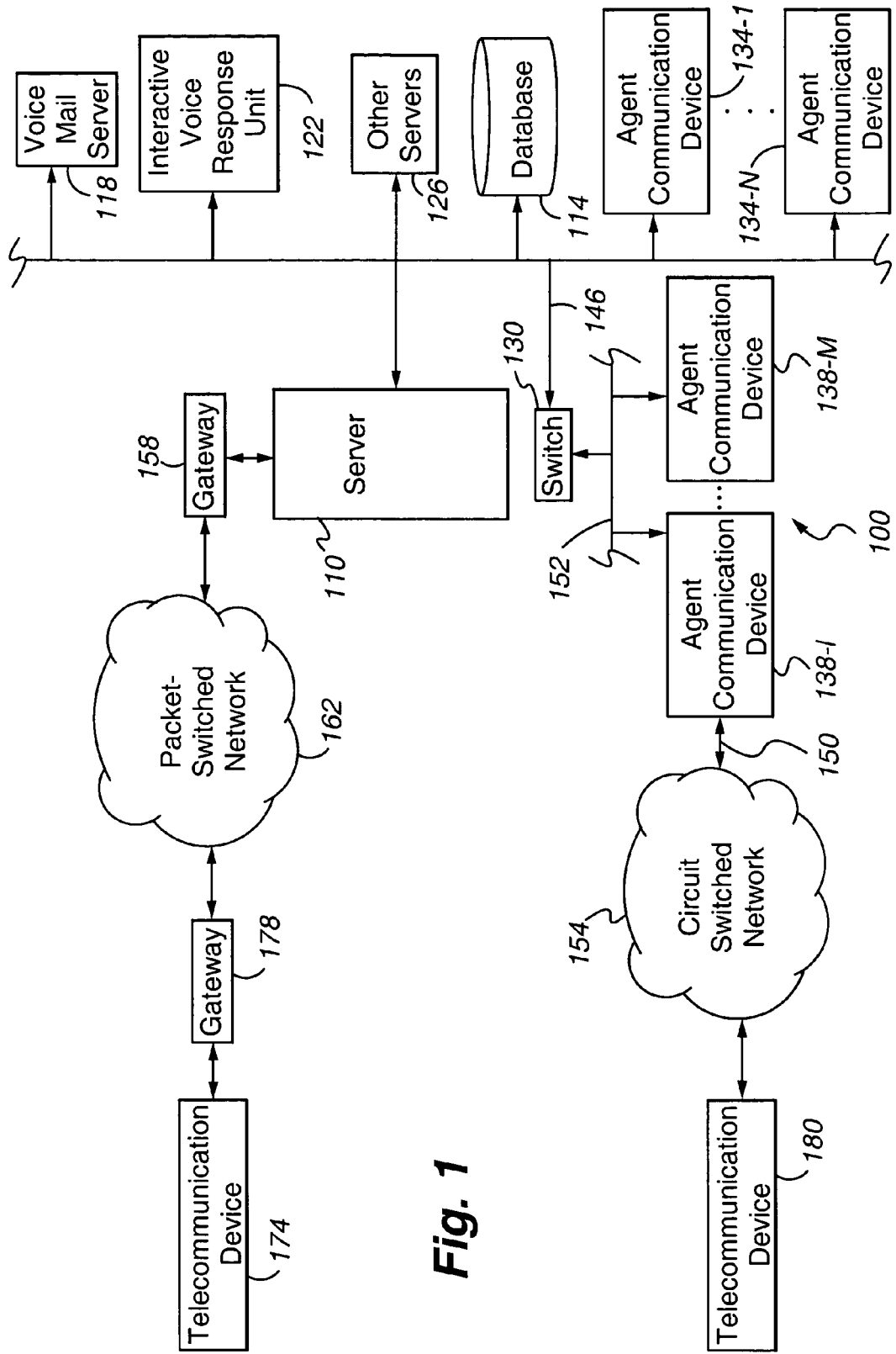
FIG. 1 is a block diagram depicting a contact center according to an embodiment of the present invention.

FIG. 1 shows an illustrative embodiment of the present invention. A contact center 100 comprises a central server 110, a set of data stores or databases 114 containing contact or customer related information and other information that can enhance the value and efficiency of the contact processing, and a plurality of servers, namely a voice mail server 118, an Interactive Voice Response unit or IVR 122, and other servers 126, a switch 130, a plurality of working agents operating packet-switched (first) telecommunication devices 134-1 to N (such as computer work stations or personal computers), and/or circuit-switched (second) telecommunication devices 138-1 to M, all interconnected by a local area network LAN (or wide area network WAN) 142. The servers can be connected via optional communication lines 146 to the switch 130. As will be appreciated, the other servers 126 can also include a scanner (which is normally not connected to the switch 130 or Web server), VoIP software, video contact software, voice messaging software, an IP voice server, a fax server, a web server, and an email server) and the like. The switch 130 is connected via a plurality of trunks 150 to the Public Switch Telecommunication Network or PSTN 154 and via link(s) 152 to the second telecommunication devices 138-1 to M. A gateway 158 is positioned between the server 110 and the packet-switched network 162 to process communications passing between the server 110 and the network 162.

The term "switch" or ".server" as used herein should be understood to include a PBX, an ACD, an enterprise switch, or other type of telecommunications system switch or server, as well as other types of processor-based communication control devices such as media servers, computers, adjuncts, etc.

Figure 2:
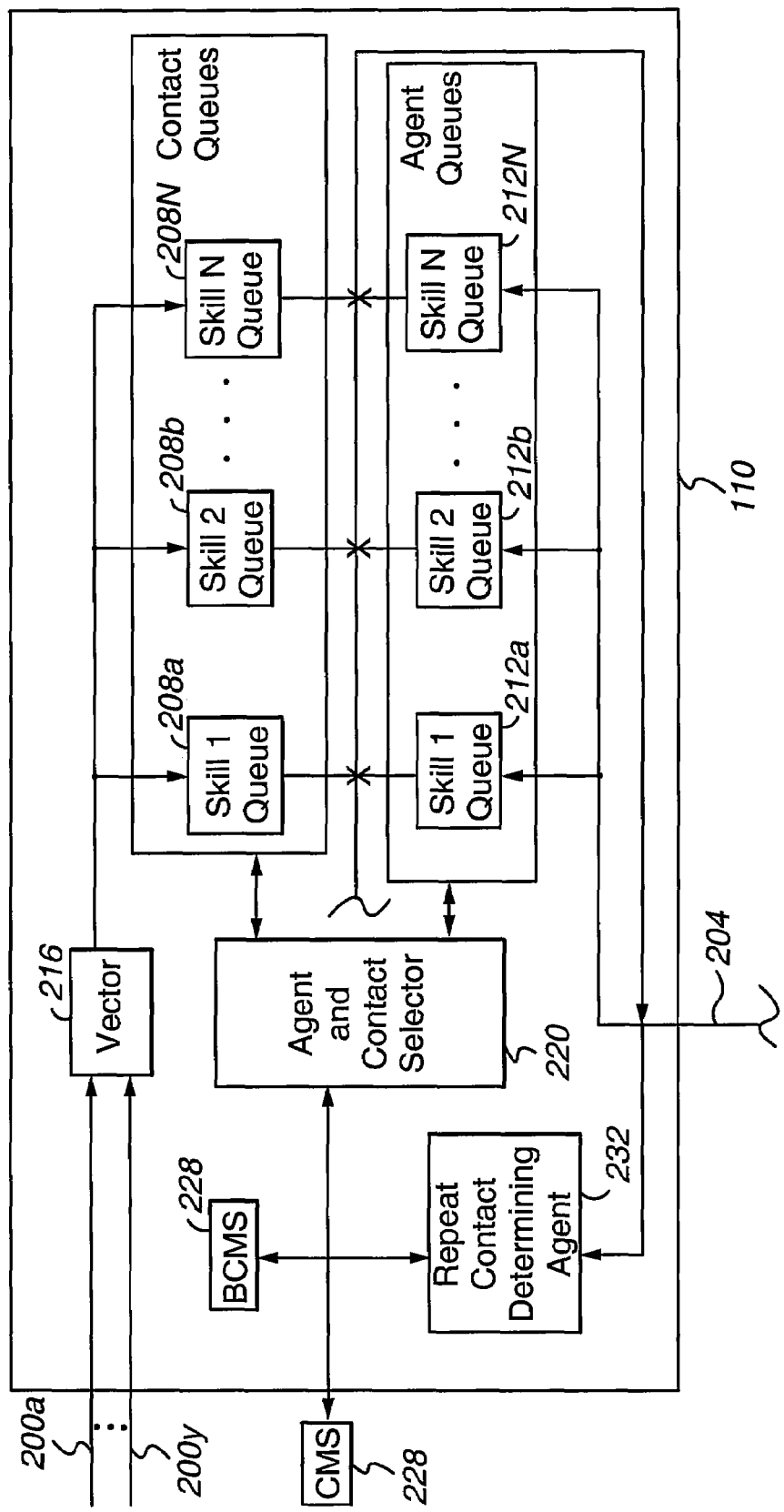
FIG. 2 is a block diagram of a server according to an embodiment of the present invention.

Referring to FIG. 2, one possible configuration of the server 110 is depicted. The server 110 is in communication with a plurality of customer communication lines 200a-y (which can be one or more trunks, phone lines, etc.) and agent communication line 204 (which can be a voice-and-data transmission line such as LAN 142 and/or a circuit switched voice line 140). The server 110 can include a Basic Call Management System or BCMS 224 and a Call Management System or CMS 228 that gathers contact records and contact-center statistics for use in generating contact-center reports. CMS and BCMS and any other reporting system will hereinafter be referred to jointly as CMS 228.

The switch 130 and/or server 110 can be any architecture for directing contacts to one or more telecommunication devices. Illustratively, the switch and/or server can be a modified form of the subscriber-premises equipment disclosed in U.S. Pat. Nos. 6,192,122; 6,173,053; 6,163,607; 5,982,873; 5,905,793; 5,828,747; and 5,206,903, all of which are incorporated herein by this reference; Avaya Inc.'s Definity™ Private-Branch Exchange (PBX)-based ACD system; Multi-Vantage™ PBX, CRM Central 2000 Server™, Communication Manager™, S8300™ media server, and/or Avaya Interaction Center™. Typically, the switch/server is a stored-program-controlled system that conventionally includes interfaces to external communication links, a communications switching fabric, service circuits (e.g., tone generators, announcement circuits, etc.), memory for storing control programs and data, and a processor (i.e., a computer) for executing the stored control programs to control the interfaces and the fabric and to provide automatic contact-distribution functionality. The switch and/or server typically include a network interface card (not shown) to provide services to the serviced telecommunication devices. Other types of known switches and servers are well known in the art and therefore not described in detail herein.

Referring to FIG. 2, included among the data stored in the server 110 is a set of contact queues 208$a$-$n$ and a separate set of agent queues 212$a$-$n$. Each contact queue 208$a$-$n$ corresponds to a different set of agent skills, as does each agent queue 212$a$-$n$. Conventionally, contacts are prioritized and either are enqueued in individual ones of the contact queues 208$a$-$n$ in their order of priority or are enqueued in different ones of a plurality of contact queues that correspond to a different priority. Likewise, each agent's skills are prioritized according to his or her level of expertise in that skill, and either agents are enqueued in individual ones of agent queues 212$a$-$n$ in their order of expertise level or are enqueued in different ones of a plurality of agent queues 212$a$-$n$ that correspond to a skill and each one of which corresponds to a different expertise level. Included among the control programs in the server 110 is a vector or workflow 216. Contacts incoming to the contact center are assigned by contact vector 216 to different contact queues 208$a$-$n$ based upon a number of predetermined criteria, including customer identity, customer needs, contact center needs, current contact center queue lengths, customer value, and the agent skill that is required for the proper handling of the contact. Agents who are available for handling contacts are assigned to agent queues 212$a$-$n$ based upon the skills that they possess. An agent may have multiple skills, and hence may be assigned to multiple agent queues 212$a$-$n$ simultaneously. Furthermore, an agent may have different levels of skill expertise (e.g., skill levels 1-N in one configuration or merely primary skills and secondary skills in another configuration), and hence may be assigned to different agent queues 212$a$-$n$ at different expertise levels. Contact vectoring is described in DEFINITY Communications System Generic 3 Contact Vectoring/Expert Agent Selection (EAS) Guide, AT&T publication no. 555-230-520 (Issue 3, November 1993). Skills-based ACD is described in further detail in U.S. Pat. Nos. 6,173,053 and 5,206,903.

Referring to FIG. 1, the gateway 158 can be Avaya Inc.'s, G700 Media Gateway™ and may be implemented as hardware such as via an adjunct processor (as shown) or as a chip in the server.

The first telecommunication devices 134-1, . . . 134-N are packet-switched and can include, for example, IP hardphones such as the Avaya Inc.'s, 4600 Series IP Phones™, IP softphones such as Avaya Inc.'s, IP Softphone™, Personal Digital Assistants or PDAs, Personal Computers or PCs, laptops, packet-based H.320 video phones and conferencing units, packet-based voice messaging and response units, any communication device, and packet-based traditional computer telephony adjuncts.

The second telecommunication devices 138-1, . . . 138-M are circuit-switched. Each of the telecommunication devices 138-1, . . . 138-M corresponds to one of a set of internal extensions Ext1, . . . ExtM, respectively. These extensions are referred to herein as "internal" in that they are extensions within the premises that are directly serviced by the switch. More particularly, these extensions correspond to conventional telecommunication device endpoints serviced by the switch/server, and the switch/server can direct incoming contacts to and receive outgoing contacts from these extensions in a conventional manner. The second telecommunication devices can include, for example, wired and wireless telephones, PDAs, H.320 video phones and conferencing units, voice messaging and response units, and traditional computer telephony adjuncts.

It should be noted that the invention does not require any particular type of information transport medium between switch or server and first and second telecommunication devices, i.e., the invention may be implemented with any desired type of transport medium as well as combinations of different types of transport medium.

The packet-switched network 162 can be any data and/or distributed processing network, such as the Internet. The network 162 typically includes proxies (not shown), registrars (not shown), and routers (not shown) for managing packet flows.

The packet-switched network 162 is in communication with an external first telecommunication device 174 via a gateway 178, and the circuit-switched network 154 with an external second telecommunication device 180. These telecommunication devices are referred to as "external" in that they are not directly supported as telecommunication device endpoints by the switch or server. The telecommunication devices 174 and 180 are an example of devices more generally referred to herein as "external endpoints."

In a preferred configuration, the server 110, network 162, and first telecommunication devices 134 are Session Initiation Protocol or SIP compatible and can include interfaces for various other protocols such as the Lightweight Directory Access Protocol or LDAP, H.248, H.323, Simple Mail Transfer Protocol or SMTP, IMAP4, ISDN, E1/T1, and analog line or trunk.

It should be emphasized that the configuration of the switch, server, user telecommunication devices, and other elements as shown in FIG. 1 is for purposes of illustration only and should not be construed as limiting the invention to any particular arrangement of elements.

As will be appreciated, the central server 110 is notified via LAN 142 of an incoming contact by the telecommunications component (e.g., switch 130, fax server, email server, web server, and/or other server) receiving the incoming contact. The incoming contact is held by the receiving telecommunications component until the server 110 forwards instructions to the component to forward or route the contact to a specific contact center resource, such as the IVR unit 122, the voice mail server 118, and/or first or second telecommunication device 134, 138 associated with a selected agent. The server 110 distributes and connects these contacts to telecommunication devices of available agents based on the predetermined criteria noted above. When the central server 110 forwards a voice contact to an agent, the central server 110 also forwards customer-related information from databases 114 to the agent's computer work station for viewing (such as by a pop-up display) to permit the agent to better serve the customer. The agents process the contacts sent to them by the central server 110. This embodiment is particularly suited for a Customer Relationship Management (CRM) environment in which customers are permitted to use any media to contact a business. In a CRM environment, both real-time and non-real-time contacts must be handled and distributed with equal efficiency and effectiveness.

According to the invention, included among the programs executing on the server 110 are an agent and contact selector 220 and repeat contact determining agent 232. The selector 220 and agent 232 are stored either in the main memory or in a peripheral memory (e.g., disk, CD ROM, etc.) or some other computer-readable medium of the center 100. The selector and agent collectively effect an assignment between available contacts and available agents in a way that tends to maximize contact center efficiency. The selector 220 uses predefined criteria, particularly the relatedness of the current contact to other, typically prior, contacts, in selecting an appropriate agent to service the contact. The repeat contact determining agent 232 determines and identifies, either through automatic or manual techniques, current contacts that are not "one-and-done" or are related to at least one other contact by the same customer.

As will be appreciated, the definition of "other contacts" can refer to one of two possibilities. In one application, "other contacts" refer only to discrete contacts received at other times; in other words, "other contact" is contact dependent. Under this construction, other contacts would exclude resource-to-resource transfers during servicing of a work item. In another application, "other contacts" considers each resource/customer interaction as a separate contact; in other words "other contact" is agent dependent. Under this construction, "other contact" includes all of the contacts of the first application (when only serviced by one resource before termination) and each interaction of a resource and the customer. For example, if a work item is first serviced by an IVR, then by a first agent, and finally by a second agent before contact termination, the agent 232 would consider this to be three contacts. The first application is particularly applicable where the existence of related (other) contacts is used in work item or contact routing decisions, and the second application is particularly applicable to collecting one-and-done statistics to measure contact center performance and/or resource performance. In the second application, each instance of a related contact of a specific skill being serviced by an agent during a specified performance period is noted in the agent's corresponding profile for the skill. In more elaborate applications, the contact center would attempt to track who the prior agent(s) were that serviced the prior related contact(s). Each contact serviced by the agent during the selected performance period that is not related to a prior and/or subsequent contact can, in some applications, be assumed to be a one-and-done contact, which can be used as a performance metric for the agent.

The agent profiles are typically maintained and updated by a profile generator (not shown). Once the contact has been handled, the generator collects selected metrics for the contact. These metrics include (but are not inclusive of) the skill of the agent servicing the contact, the identifier of the agent, the duration of the contact, the transaction or contact type (e.g., catalog sale, information request, complaint, etc.), the time-of-day, and the result or disposition (e.g., the type of sale, units sold, information requested, revenue generated, service ticket closure or escalation, the information provided, etc.). The generator should also include the following ratings: a self-rating of the servicing agent, a supervisor's rating of the agent's proficiency in handling the contact, the customer's rating of the agent's proficiency in handling the contact, any third party rating services' comments on the agent's proficiency in handling the contact, and any other satisfaction and other survey ratings. These metrics and ratings are then stored in the database 114, such as CMS 228. The metrics over a selected period of time are typically stored under each profile. Thus, each profile typically includes metrics associated with a plurality of contacts serviced by the agent for each agent skill. The information can be weighted by age. Weighting favors data obtained from more recent contacts over data obtained from contacts in the more distant past. The generator can then use the collected information to generate a set of scores for a set of metrics, such as a proficiency score and an agent satisfaction score for each skill. Typically, there is a plurality of profiles for each agent, with each profile corresponding to a respective skill of the agent. In one configuration, each profile for a selected agent has a corresponding measure of the number or percentage of contacts of the corresponding skill serviced by the selected agent that are not one-and-done or are repeated related contacts from the same customer. This measure may be used in deciding which of two possible agents will be used to service a current contact; that is, the preferred agent would likely be the agent having the lower one-and-done measure.

The agent 232, when a contact is received, determines whether the contact is related to another contact by the same customer. Such information can be used to provide special service treatment to the contact (such as sending such contacts to an appropriate destination or recording the contact interaction), monitor contact center performance, identify product types that are frequently the subject of repeated contacts by the same customer, identify customers who initiate repeated contacts regarding the same subject matter and the frequency with such repeated contacts are received from the customer, monitor agent performance (with a higher incidence of repeated contacts being considered a metric of poorer agent performance), and the like. If the number of contacts received in a specified period of time, such as in the course of a working day, or by a specified resource that are related to another contact is known, then it may be reliably assumed that the remaining contacts received in the specified time period or by the specified resource were not related to other contacts from the same customer. Stated another way, if there are contacts from the same customer during a specified time period (e.g., working day, etc.) that are not related to one another then the contacts can each be reliably considered one-and-done. There are several techniques to identify related contacts. For example, a trouble ticket number, case number, claim number, invoice number, customer phone number, or other subject matter identifier associated with a prior contact may be received from the customer in the current contact. The number may be provided to a servicing agent or to an automated resource, such as an IVR, by the customer. In one configuration, after termination of the contact the last agent to service the contact inputs contact-related information into the respective customer's profile. The information includes a description of the subject matter of the contact and the result. The description may include a subject matter identifier defining a general class or type of purpose of the contact. For example, a first identifier may be associated with a first contact purpose and a second different identifier with a second different contact purpose. The customer, during the current contact, may be solicited by a human agent and/or an automated resource as to whether the current contact is related to a prior contact. A time interval can be used to distinguish between one-and-done contacts and non-one-and-done contacts. If a contact from a customer is received within a selected time period following a prior contact by the same customer, the second, later contact can be assumed to be related to the prior contact, and, if the contact is not received within a selected time period following a prior contact by the same customer, the second, later contact is assumed to be unrelated to a prior contact by the same customer. Contextual analysis could be performed on the customer's (and/or the servicing agent's) oral and/or written statements to a contact center resource to identify key words indicating that the contact is a repeat contact related to an earlier contact. The key words could be identified using voice recognition techniques to produce a transcript of the statement's followed by parsing by an algorithm that identifies key words, such as "earlier", "again", "called", "contacted" and the like. The acoustic "fingerprint" or spectral content of one or more spoken words can be used to relate the contact to another contact by the same customer. The algorithm could also look for a reference to a product model number, serial number, type, and the like for which the customer had previously called. In the case of email, instant messaging, and other non-real-time contacts, digital text is already present in the communication and can be subjected to parsing by the algorithm. For example, the algorithm could examine the "regarding" or "subject" line on the email or instant message for contact-relatedness information. The algorithm could monitor the text appearing on the servicing agent's screen or monitor for contact-relatedness information. During or after servicing of the contact, the servicing agent could indicate whether the contact was or was not related to another contact by the same customer. In a non-real-time contact, the receipt of information from a cookie on the customer's computer can indicate relatedness to a prior contact. Also, the receipt of a completed form previously provided to the customer in an earlier contact can establish relatedness to the prior contact.

As will be appreciated, it can be important to remove certain types of "related contacts" from the number of related contact instances attributed to a selected agent. For example, the customer may contact the contact center by means of multiple channels, such as email and live voice, before receiving a response to obtain an answer to the same question. Although the contacts are technically related and discrete, they should not be tracked as not-one-and-done. In another example, a first agent handles a first contact of a first customer while a second agent handles a second related contact of the first customer. As a result of the second agent's participation, the first customer makes no later related contacts with the contact center. The first agent should be credited with the not-one-and-done contact while the second agent should be credited with a final disposition of the first customer's needs. In other words, the first agents' not-one-and-done indicator is incremented by one while the second agent's indicator remains the same.

Figure 4:
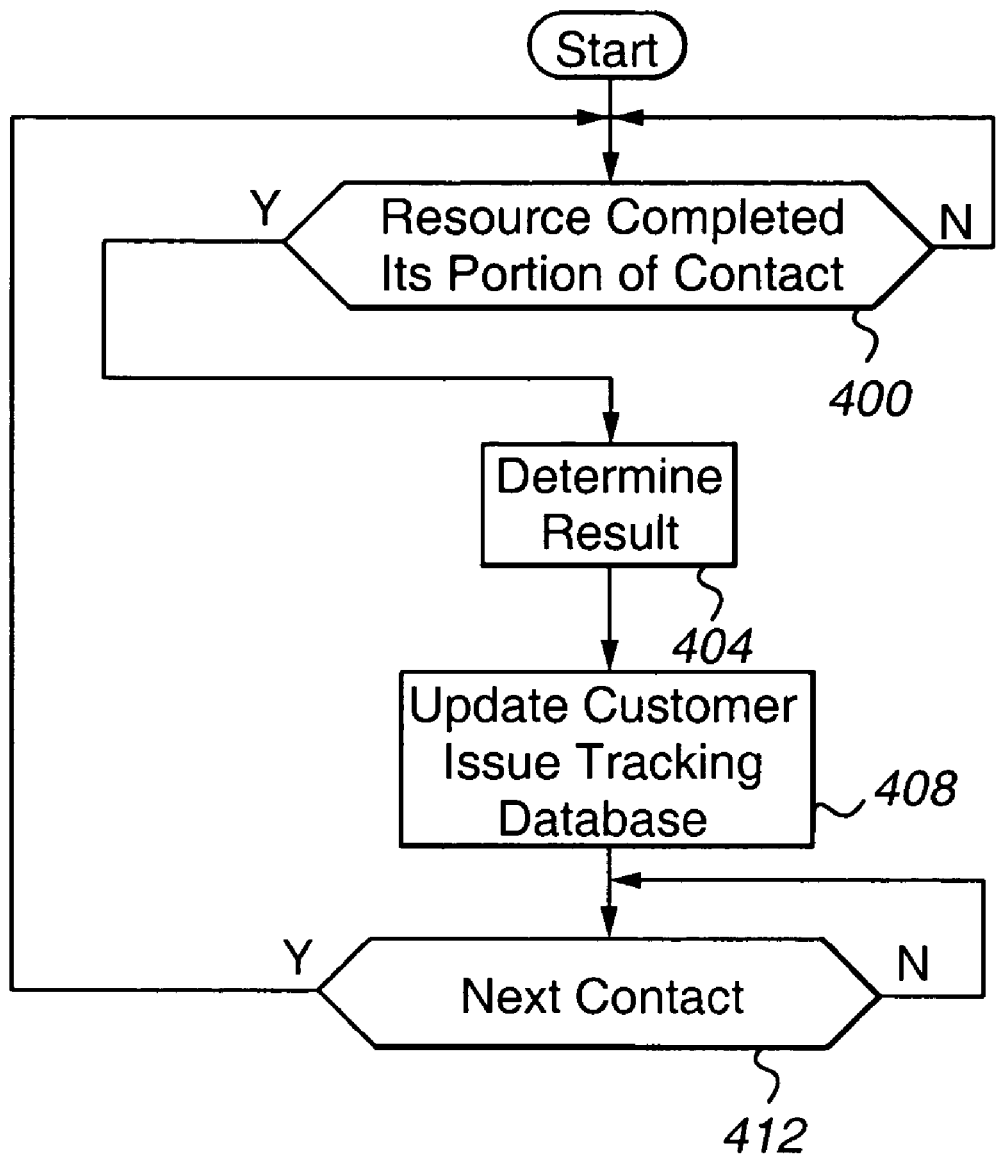
FIG. 4 is a flow chart depicting an operational embodiment of the repeat contact determining agent.

The operation of the repeat contact determining agent 232 is provided in FIG. 4. In decision diamond 400, the agent 232 determines if a contact center resource (whether automated or human) has completed its portion of a contact. This determination could be done on a resource-by-resource basis or only on a contact-by-contact basis. In the former case, decision diamond 400 is satisfied when the contact is transferred from one resource to another resource. In the latter case, the decision diamond is satisfied only when the contact is terminated with (all resources of) the contact center. The agent 232 repeats decision diamond 400 until such a completion is identified. If a completion is identified, the agent 232 determines the result. The result includes whether the purpose of the customer's contact is believed to be fully serviced, whether a further contact with the customer is scheduled, required or anticipated, and/or closed. As noted above, "prior contact" can be determined on a contact-dependent or agent-dependent basis. In the former case, the result is determined after contact termination. In the latter case, the result is determined after a resource has completed servicing the contact. Where one or more resource-to-resource transfers occur in the same communication, the result is determined after each transfer and typically stored in the previously servicing resource's profile. In step 408, the agent 232 updates the customer profile to indicate the date of the contact, the servicing resource(s), the subject matter of the contact, the subject matter number if any, the result of the contact, and contact service duration. After the customer's profile is updated, the agent 232 proceeds to decision diamond 412 and determines whether there is a next (current) contact to be monitored. Decision diamond 412 is repeated until such a contact is identified. If such a contact is identified, the agent 232 returns to decision diamond 400 and monitors the contact.

Figure 3:
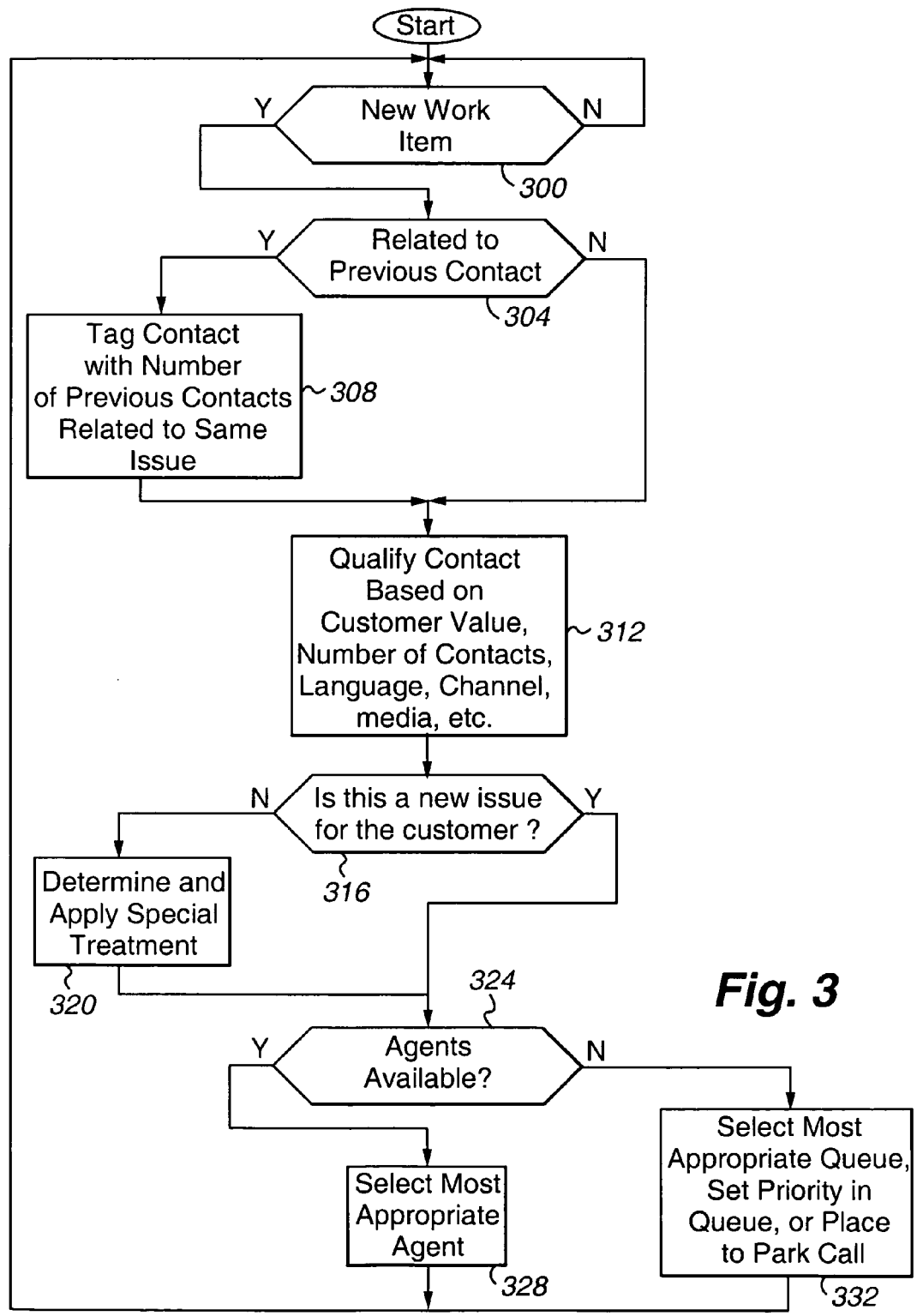
FIG. 3 is a flow chart depicting an operational embodiment of the agent and contact selector.

The operation of the agent and contact selector 220 is shown in FIG. 3.

Referring to FIG. 3, the selector 220 at decision diamond 300 determines whether or not there is a new work item in one of the contact queues 208a-n. Decision diamond 300 is repeated until a new work item is identified. When a new work item is identified, the selector 220 in step 304 retrieves the contacting customer's profile(s) from database 114 and determines whether the new work item is related to a previous contact. If so, the selector 220 proceeds to step 308, in which the enqueued work item is tagged with the number of previous contacts by the same customer related to the same issue. The tagging may be effected by any suitable technique. For example, the tag may be a link to the fields in the customer profile indicating the number of prior contacts related to the same issue. Alternatively, the tag may be the addition of a prior contact field to the description of the work item itself or an identifier that links all contacts from a given customer about a given issue. If there are no related prior contacts or after step 308, the selector 220 proceeds to step 312. In step 312, the selector 220 qualifies the work item based on a number of selected indicators, including customer value, customer need(s) or purpose of the contact, the number of related contacts, language required to service the customer, channel on which the contact is received, media through which the contact is transmitted (e.g., email, instant messaging, web chat, live voice, etc.), etc. Qualification typically depends upon the application of contact center policies and rules. Qualification may assign a priority to the work item, determine an appropriate agent skill to service the work item, need for special treatment (e.g., escalation), deflect an item to an alternate form of service such as content analysis or an IVR, and the preferred agent to service the contact. After completing step 312, the selector 220, in optional decision diamond 316, determines whether or not the work item relates to a new issue for which the customer has not previously contacted the contact center. In one configuration, the selector 220 assumes that the work item does not involve a new issue if there is a prior related contact from the same customer. In another configuration, the selector 220, even though a preliminary conclusion has been reached that the contact is related to a prior contact, determines, such as by forwarding the work item to an automated resource, whether or not the current contact is indeed related to a prior contact. When the contact is not directed in whole or in part to a new issue, or the contact is related to a prior contact from the same customer, the selector 220 determines and applies special treatment to the work item in step 320. The appropriate treatment is typically defined by contact center rules and/or policies. The typical goal of such treatment is to fulfill the purpose of the customer's contact so as to avoid further contacts with the customer relating to the same issue. Treatment can include measures such as routing the work item to a better skilled agent or an agent specially trained to deal with repeat contacts, activating quality monitoring (contact recording to produce a transcript), initiating observation of the servicing of the work item by contact center resource(s) typically by a supervisor, alerting a business manager or executive or automated technology, increasing the assigned priority of the contact and the like. When the work item is related to a new issue or after completion of step 320, the selector 220 determines which of the qualified agents (as defined by the qualification step 312 and/or special treatment determination step 320) are currently available to service the contact in decision diamond 324. When the most appropriate or most desired agent(s) are currently available, the selector 220 in step 328 selects one of the agents to service the contact. When the most desired agent(s) are not currently available, the selector 220 in step 332 selects the most appropriate queue 208a-n for the work item, sets the priority (or queue position) of the work item in the queue 208a-n, and/or determines a place to park the work item until the desired agent is available. After completing steps 328 and 332, the selector 220 proceeds to and repeats decision diamond 300 for a next work item.

A number of variations and modifications of the invention can be used. It would be possible to provide for some features of the invention without providing others.

For example, the server and/or switch can be a software-controlled system including a processing unit (CPU), microprocessor, or other type of digital data processor executing software or an Application-Specific Integrated Circuit (ASIC) as well as various portions or combinations of such elements. The memory may be a random access memory (RAM), a read-only memory (ROM), or combinations of these and other types of electronic memory devices.

Any other suitable agent assignment algorithm may be employed for assigning an agent to service a contact. As will be appreciated, the algorithms of FIGS. 3 and 4 are only exemplary and not intended to be exclusive or limiting.

The present invention may be implemented as software, hardware (such as a logic circuit), or a combination thereof.

The present invention, in various embodiments, includes components, methods, processes, systems and/or apparatus substantially as depicted and described herein, including various embodiments, subcombinations, and subsets thereof. Those of skill in the art will understand how to make and use the present invention after understanding the present disclosure. The present invention, in various embodiments, includes providing devices and processes in the absence of items not depicted and/or described herein or in various embodiments hereof, including in the absence of such items as may have been used in previous devices or processes, e.g. for improving performance, achieving ease and\or reducing cost of implementation.

Moreover though the description of the invention has included description of one or more embodiments and certain variations and modifications, other variations and modifications are within the scope of the invention, e.g. as may be within the skill and knowledge of those in the art, after understanding the present disclosure. It is intended to obtain rights which include alternative embodiments to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

What is claimed is:

1. A method, comprising:
 (a) a processor tracking, over a selected time period and for a set of agents servicing discrete real-time and non-real-time contacts from different customers, a number of discrete real-time and non-real-time contacts serviced by the set of agents that are related to at least one other discrete real-time and non-real-time contact, wherein two or more contacts are related when the contacts involve a common customer and at least one of a group consisting of a common subject matter and a common purpose;
 (b) the processor maintaining, for at least one of the agents, an indicator indicating at least one of a group consisting of (i) a number of discrete real-time and non-real-time contacts that are not related to one or more other discrete real-time and non-real-time contacts and (ii) a number of discrete real-time and non-real-time contacts that are related to one or more other discrete real-time and non-real-time contacts; and
 (c) using the indicator for at least one of the following purposes:
 (c1) evaluation, by the processor, of performance of the contact center and/or one or more agents; and
 (c2) determination, by the processor, of a routing destination for a selected currently pending contact.

2. The method of claim 1, further comprising:
 (d) when a first contact of a first customer is serviced by the set of agents, receiving from the servicing agent a subject matter identifier indicating a purpose of the serviced first contact; and
 (e) when a later second contact is received from the first customer, comparing a second subject matter identifier associated with the second contact with the first subject matter identifier to determine whether the first and second contacts are related.

3. The method of claim 2, wherein, when the first and second identifiers are similar, the first and second contacts are deemed to be related.

4. The method of claim 1, wherein, when two contacts are received from the same customer during a predetermined period of time, the two contacts are deemed to involve at least one of a common subject matter and purpose and therefore are deemed to be related.

5. The method of claim 1, further comprising:
 (d) monitoring a set of communications between a servicing agent in the set of agents and a customer during servicing of a contact; and
 (e) based on the set of communications, determining that the contact is related to another contact from the same customer.

6. The method of claim 5, wherein the monitoring step comprises:
 analyzing the set of communications for at least one selected word and wherein in the determining step, the presence of the at least one selected word means that the contact is related to another contact.

7. The method of claim 1, wherein each agent in the set has a corresponding indicator indicating a number of contacts, serviced by the set of agents during a selected time period, that are (i) not related to another contact serviced by one or more of the plurality of agents or (ii) related to another contact serviced by one or more of the plurality of agents and further comprising:
   (d) receiving a contact to be serviced by one of the plurality of agents;
   (e) retrieving agent profiles for the set of agents; and
   (f) assigning one of the set of agents to service the contact based, at least in part, on a comparison of the indicators corresponding to the agents in the set.

8. The method of claim 1, wherein the indicator indicates a number of contacts, serviced by the set of agents during the selected time period, that are not related to another contact serviced by one or more of the plurality of agents and wherein a single contact is defined as each interaction between a selected agent and a selected customer such that an agent-to-agent transfer of a communication from the selected customer is considered to represent multiple contacts.

9. The method of claim 1, wherein the indicator indicates a number of contacts, serviced by the set of agents during the selected time period, that are related to another contact serviced by one or more of the plurality of agents and wherein a single contact is defined as all interactions between all members of the set of agents and a selected customer such that an agent-to-agent transfer of a communication from the selected customer is considered to represent a single contact.

10. The method of claim 1, wherein the set of agents comprises one or more agents in the plurality of agents, wherein the related contact is a prior contact, and wherein the membership of the set of agents is defined by skill.

11. A computer readable medium comprising processor executable instructions to perform the steps of claim 1.

12. A method, comprising:
   (a) a processor receiving a first contact from a first customer;
   (b) a repeat contact determining agent executing on the processor, the repeat contact determining agent determining whether the first contact is related to a second real-time or non-real-time contact, wherein two or more contacts are deemed to be related when the contacts involve a common customer and at least one of a group consisting of a common subject matter and a common purpose; and
   (c) when the first contact and the second contact are related, a contact center resource servicing the first contact differently than when the first contact is unrelated to a second real-time or non-real-time contact.

13. The method of claim 12, wherein in step (a) the first real-time contact is in queue awaiting servicing and further comprising:
   (d) while in queue, tagging the first contact with a number of related previous real-time and/or non-real-time contacts with the first customer.

14. The method of claim 12, wherein the servicing step comprises:
   when the first and/or second contact is related to a previous contact with the first customer, at least one of (i) recording the first and/or second contact interaction to form a transcript of the interaction, (ii) forwarding the first and/or second contact to a first agent having a first skill, and (iii) activating quality monitoring; and
   when the first and/or second contact is unrelated to a previous contact with the first customer, not performing the at least one of (i) recording the first and/or second contact interaction to form a transcript of the interaction, (ii) forwarding the first and/or second contact to a first agent having a first skill, and (iii) activating quality monitoring.

15. The method of claim 12, wherein contacts are serviced by a plurality of agents and further comprising:
   (d) tracking, for each of the plurality of agents over a selected time period, a number of contacts from different customers serviced by the agent that are related to another contact serviced by the plurality of agents; and
   (e) maintaining, for each of the plurality of agents, an indicator indicating at least one of (i) a number of contacts from different customers, serviced by the corresponding agent during the selected time period, that are not related to another contact serviced by the plurality of agents and (ii) a number of contacts from different customers, serviced by the corresponding agent during the selected time period, that are related to another contact serviced by the plurality of agents.

16. The method of claim 15, further comprising:
   (f) when the first and/or second contact of the first customer is serviced by an agent, receiving from the servicing agent a subject matter identifier indicating a purpose of the serviced contact; and
   (g) when a later third contact is received from the first customer, comparing a second subject matter identifier associated with the third contact with the first subject matter identifier to determine whether the first and/or second and third contacts are related.

17. The method of claim 16, wherein, when the first and second identifiers are similar, the first and/or second and third contacts are deemed to be related.

18. The method of claim 15, wherein, when two contacts are received from the same customer during a predetermined period of time, the two contacts are deemed to involve at least one of a common subject matter and purpose and therefore are deemed to be related.

19. The method of claim 15, further comprising:
   (f) monitoring a set of communications between a servicing agent and a customer during servicing of the first and/or second contact; and
   (g) based on the set of communications, determining that the first and/or second contact is related to a previous contact from the same customer.

20. The method of claim 19, wherein the monitoring step comprises:
   analyzing the set of communications for at least one selected word and wherein, in the determining step, the presence of the at least one selected word means that the first and/or second contact is related to the previous completed contact.

21. The method of claim 15, further comprising:
   (f) receiving a third contact from a second customer to be serviced by one of the plurality of agents;
   (g) retrieving agent profiles for a selected subset of the plurality of agents; and
   (h) assigning one of the subset of agents to service the third contact based, at least in part, on a comparison of the indicators corresponding to the agents in the subset.

22. The method of claim 15, wherein the indicator indicates a number of contacts, serviced by the corresponding agent during the selected time period, that are not related to another contact serviced by the agent and wherein a single contact is defined as all interactions between all members of the set of agents and a selected customer such that an agent-to-agent transfer of a communication from the selected customer is considered to represent a single contact.

23. The method of claim 15, wherein the indicator indicates a number of contacts, serviced by the corresponding agent during the selected time period, that are related to a previous contact serviced by the agent and wherein a single contact is defined as each interaction between a selected agent and a selected customer such that an agent-to-agent transfer of a communication from the selected customer is considered to represent multiple contacts.

24. A computer readable medium comprising processor executable instructions to perform the steps of claim 12.

25. A contact center, comprising:
   (a) an input operable to receive a contact from a first customer; and
   (b) a selector in communication with the input, the selector operable (i) to determine whether the received real-time contact is related to another real-time or non-real-time contact with the first customer, wherein two or more contacts are deemed to be related when the contacts involve a common customer and at least one of a group consisting of a common subject matter and a common purpose, and (ii) when the received real-time contact is related to at least one real-time and non-real-time contact;
   (c) a contact center resource in communication with the selector, the contact center resource operable to service the received real-time contact differently than when the received real-time contact is unrelated to another real-time or non-real-time contact.

26. The contact center of claim 25, wherein the selector is further operable (iii) to tag the received contact, while in queue awaiting servicing, with a number of related real-time and non-real-time contacts with the first customer.

27. The contact center of claim 25, wherein the selector, when the received contact is related to a previous contact with the first customer, at least one of (i) records the received contact interaction to form a transcript of the interaction, (ii) forwards the received contact to a first agent having a first skill, and (iii) activates quality monitoring and, when the received contact is unrelated to a previous contact with the first customer, does not at least one of (i) record the received contact interaction to form a transcript of the interaction, (ii) forward the received contact to a first agent having a first skill, and (iii) activate quality monitoring.

28. The contact center of claim 25, wherein the contact center includes a plurality of agents to service a plurality of contacts and further comprising:
   (c) a repeat contact determining agent operable (i) to track, for each of the plurality of agents over a selected time period, a number of contacts serviced by the agent that are related to a previous contact serviced by the agent and (ii) to maintain, for each of the plurality of agents, an indicator indicating at least one of (a) a number of contacts, serviced by the corresponding agent during the selected time period, that are not related to a previous contact serviced by the agent; and
   (b) a number of contacts, serviced by the corresponding agent during the selected time period, that are related to a previous contact serviced by the agent.

29. The contact center of claim 28, wherein the determining agent is further operable (iii), when a received contact of a first customer is serviced by an agent, to receive from the servicing agent a subject matter identifier indicating a purpose of the serviced received contact and (iv), when a later second contact is received from the first customer, to compare a second subject matter identifier associated with the second contact with the first subject matter identifier to determine whether the received and second contacts are related.

30. The contact center of claim 29, wherein, when the first and second identifiers are the same, the received and second contacts are deemed to be related.

31. The contact center of claim 28, wherein, when two contacts are received from the same customer during a predetermined period of time, the two contacts are deemed to involve at least one of a common subject matter and purpose and therefore are deemed to be related.

32. The contact center of claim 28, wherein the determining agent is further operable (iii) to monitor a set of communications between a servicing agent and a customer during servicing of the received contact and (iv), based on the set of communications, to determine that the received contact is related to a previous completed contact from the same customer.

33. The contact center of claim 32, wherein the determining agent analyzes the set of communications for at least one selected word and wherein, in the determining operation, the presence of the at least one selected word means that the received contact is related to the previous contact.

34. The contact center of claim 28, wherein the input is further operable to receive a second contact from a second customer to be serviced by one of the plurality of agents and wherein the selector is further operable (iii) to retrieve agent profiles for a selected subset of the plurality of agents and (iv) to assign one of the subset of agents to service the second contact based, at least in part, on a comparison of the indicators corresponding to the agents in the subset.

35. The contact center of claim 28, wherein the indicator indicates a number of contacts, serviced by the corresponding agent during the selected time period, that are not related to a previous contact serviced by the agent and wherein a single contact is defined as each interaction between a selected agent and a selected customer such that an agent-to-agent transfer of a communication from the selected customer is considered to represent multiple contacts.

36. The contact center of claim 28, wherein the indicator indicates a number of contacts, serviced by the corresponding agent during the selected time period, that are related to a previous contact serviced by the agent and wherein a single contact is defined as all interactions between all members of the set of agents and a selected customer such that an agent-to-agent transfer of a communication from the selected customer is considered to represent a single contact.

37. The method of claim 1, further comprising:
   (c) identifying, for at least one of an agent and selected grouping of agents a number of one-and-done contacts serviced by the at least one of an agent and selected grouping of agents, wherein each of the one-and-done contacts is not related to one or more other contacts from a common customer.

38. The method of claim 12, further comprising:
   (d) identifying, for at least one of an agent and selected grouping of agents a number of one-and-done contacts serviced by the at least one of an agent and selected grouping of agents, wherein each of the one-and-done contacts is not related to one or more other contacts from a common customer.

* * * * *